(12) United States Patent
Schilders

(10) Patent No.: US 12,216,652 B2
(45) Date of Patent: Feb. 4, 2025

(54) IN-SITU DATA ANALYSIS IN GRAPH-BASED MODELS

(71) Applicant: INFOSYS LIMITED, Bangalore (IN)

(72) Inventor: Steven Schilders, Columbus, IN (US)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 18/587,412

(22) Filed: Feb. 26, 2024

(65) Prior Publication Data

US 2024/0289327 A1 Aug. 29, 2024

Related U.S. Application Data

(60) Provisional application No. 63/449,233, filed on Mar. 1, 2023, provisional application No. 63/448,738, filed on Feb. 28, 2023, provisional application No. 63/448,831, filed on Feb. 28, 2023, provisional application No. 63/448,724, filed on Feb. 28, 2023, provisional application No. 63/448,711, filed on Feb. 28, 2023.

(51) Int. Cl.
*G06F 16/2452* (2019.01)
*G06F 16/215* (2019.01)

(52) U.S. Cl.
CPC ...... *G06F 16/24526* (2019.01); *G06F 16/215* (2019.01)

(58) Field of Classification Search
None
See application file for complete search history.

(56) References Cited

U.S. PATENT DOCUMENTS

| 2018/0074870 A1* | 3/2018 | Park | G06F 16/278 |
| 2018/0341721 A1* | 11/2018 | Xu | G06F 16/9024 |
| 2021/0200794 A1* | 7/2021 | Pemmaraju | G06Q 10/10 |

* cited by examiner

*Primary Examiner* — Irene Baker
(74) *Attorney, Agent, or Firm* — Finnegan, Henderson, Farabow, Garrett & Dunner LLP

(57) ABSTRACT

An overlay system is provided that includes a storage element and processing circuitry coupled thereto. The storage element stores an executable graph-based model including a plurality of nodes, a plurality of rule overlay nodes, and a plurality of data analysis overlay nodes. The processing circuitry receives a stimulus indicative of a data analysis operation and identifies a first node, a rule overlay node associated with the first node, and a data analysis overlay node associated with the first node. The processing circuitry executes a set of rules associated with the rule overlay node on a composition of the first node to generate a set of outputs. The data analysis overlay node uses the set of outputs to determine whether a data analysis score associated with the first node exceeds a data analysis score threshold.

20 Claims, 15 Drawing Sheets

IN-SITU DATA ANALYSIS IN GRAPH-BASED MODELS

CROSS-REFERENCE TO RELATED APPLICATIONS/INCORPORATION BY REFERENCE

This patent application refers to, claims priority to, and claims the benefit of U.S. Provisional Patent Application Ser. No. 63/448,738, filed Feb. 28, 2023; U.S. Provisional Patent Application Ser. No. 63/448,724, filed Feb. 28, 2023; U.S. Provisional Patent Application Ser. No. 63/448,831, filed Feb. 28, 2023; U.S. Provisional Patent Application Ser. No. 63/448,711, filed Feb. 28, 2023; and U.S. Provisional Patent Application Ser. No. 63/449,233, filed Mar. 1, 2023. Each of the above-referenced applications is hereby incorporated herein by reference in its entirety.

FIELD OF THE DISCLOSURE

Various embodiments of the present disclosure relate generally to graph-based models. More specifically, various embodiments of the present disclosure relate to in-situ data analysis in executable graph-based models.

BACKGROUND

In the present era, data plays a crucial and indispensable role in various domains (for example, research and development, training of machine learning models, or the like). Each domain uses different types of data for different tasks associated therewith. Hence, for each domain, the data is required to meet different requirements of different tasks associated therewith. Therefore, prior to its use, the data is required to be evaluated to determine whether it meets the requirements of a corresponding task for which it is to be used. Traditionally, the data is evaluated using a third-party solution (for example, a data analysis system). Therefore, the data has to be inputted to the third-party solution for evaluation thereof. Hence, the data has to be shared with the third-party solution which is inconvenient and undesirable. Further, the task may be time-critical, hence, such delays may negatively affect the task. In some instances, the data may be confidential or sensitive. Therefore, evaluating such data using the third-party solution may leave it vulnerable and compromise its security.

In light of the foregoing, there exists a need for a technical and reliable solution that overcomes the abovementioned problems.

Limitations and disadvantages of conventional and traditional approaches will become apparent to one of skill in the art, through the comparison of described systems with some aspects of the present disclosure, as set forth in the remainder of the present disclosure and with reference to the drawings.

SUMMARY

Methods and systems for facilitating in-situ data analysis in executable graph-based models are provided substantially as shown in, and described in connection with, at least one of the figures.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

Embodiments of the present disclosure are illustrated by way of example and are not limited by the accompanying figures. Similar references in the figures may indicate similar elements. Elements in the figures are illustrated for simplicity and clarity and have not necessarily been drawn to scale.

DETAILED DESCRIPTION

Figure 1:
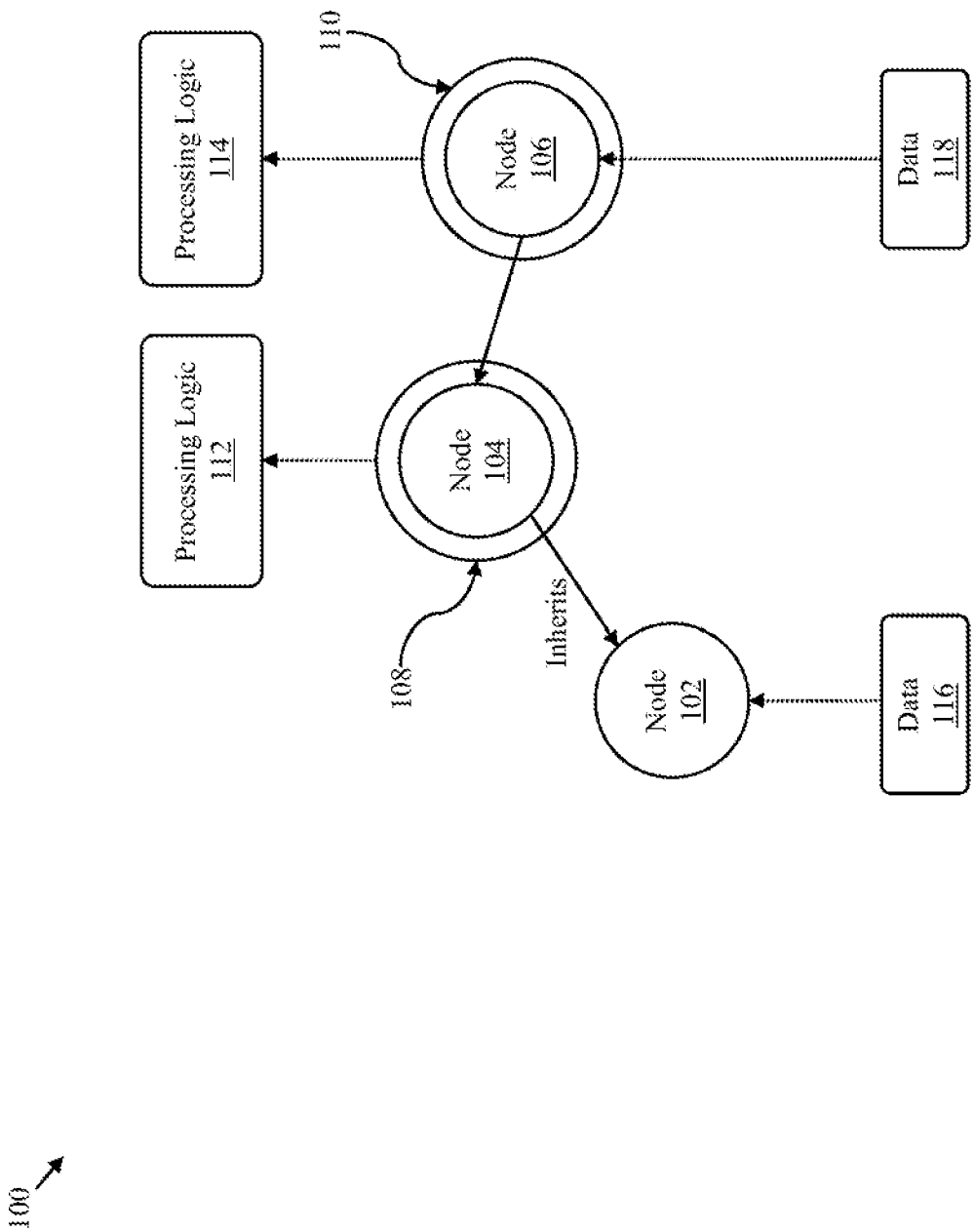
FIG. 1 is a graph that illustrates a composition of an executable graph-based model, in accordance with an embodiment of the present disclosure.

The detailed description of the appended drawings is intended as a description of the embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Overview:

In recent times, data has become crucial for numerous domains (for example, artificial intelligence, research and development, marketing, hospitality, inventory management, or the like). Data has its use in these domains for execution of various operations associated therewith. For each operation, data to be used has to meet one or more requirements associated with the operation. Therefore, the data is required to be evaluated to determine whether it meets the associated requirements. Presently, the data is evaluated using an external data analysis system. Notably, such evaluation is performed in an offline manner. That is to say that, the data is provided to the external data analysis system for evaluation, while the operation waits for the data evaluation. Such wait may lead to a delay in the execution of the operation. Also, sometimes such delay may act as a bottleneck in the execution of the operation. Moreover, the requirements for which the data is to be analyzed may be dynamic and thus may change with time. Therefore, the third-party solution (e.g., the external data analysis system) is to be provided with updated requirements whenever there is a change in the requirements. This may be repetitive, inconvenient, and prone to human error. In some instances, when the operation may be time-critical, the delay may be unfavorable and may have a negative impact on the operation. Further, if the data to be evaluated is confidential and sensitive, evaluation by the third-party solution may leave the data vulnerable and may compromise its security.

The present disclosure is directed to facilitation of in-situ data analysis in an executable graph-based model of an overlay system. The executable graph-based model is a customized hypergraph having hyper-edges that include one or more roles and vertices that are realized by way of executable nodes. Each executable node is a base node that is extended by way of one or more overlays. Each executable node is associated with a particular node type. For example, an edge node corresponds to a base node with an edge node type. Nodes (for example, base nodes and executable nodes) are connected with other nodes by way of roles included in an edge node therebetween. In some embodiments, roles are represented by way of nodes of role node type. Role node between two nodes may be indicative of a context regarding an association therebetween.

The overlay system disclosed herein may be used to implement various systems that require evaluation of data. The overlay system disclosed herein allows for in-situ data analysis of data associated with a system that is implemented using the executable graph-based model. The data may be stored at a plurality of executable nodes of the executable graph-based model. Each executable node is associated with a rule overlay node and a data analysis overlay node. The rule overlay includes a set of rules that when executed on data associated with corresponding executable node generates a set of outputs. Further, the data analysis overlay node associated with the executable node may use the set of outputs to determine a data analysis score. The data analysis overlay node may further determine whether the data analysis score exceeds a data analysis threshold score. The data analysis score being greater than the data analysis threshold score indicates that the data being analyzed is fit to be used for a system operation being executed by the overlay system. Notably, data to be used for different system operations being executed by the overlay system may be required to adhere to different sets of rules. Therefore, the disclosed overlay system may perform different data analysis operations to analyze data associated with different system operations.

Presently, the data analysis system is a third-party system. Hence, data to be analyzed is required to be shared with the third-party system. The overlay system disclosed herein facilitates in-situ data analysis, hence, the data gets analyzed within the overlay system without being shared with any external system. Further, the data analysis system works in an offline manner which induces latency in the operation associated with the data. On the contrary, the overlay system disclosed herein performs the analysis of the data in real-time or near real-time. Therefore, the data is analyzed as soon as it enters the overlay system and the data is available for use as soon as it is analyzed. Further, the data analysis system may compromise the security and confidentiality of data. However, since the overlay system disclosed herein does not require the data to be shared, the data remains secure and confidential. Moreover, for communicating the data to the data analysis system and receiving the data therefrom requires availability of a communication network. Hence, such data analysis is dependent on availability of the communication network. The system and method disclosed herein do not require communication with any external system, and hence, are independent of availability of the communication network.

Notably, the present disclosure allows for facilitation of in-situ data analysis in the overlay system in real-time. The data is available to be used as soon as it is analyzed and without any significant delay. Further, the data analysis is performed within the system, and hence, does not require involvement of any third-party systems. That is to say that, the data is not required to be communicated outside the overlay system. Therefore, the present disclosure allows for data analysis to be performed without compromising the security of the data. Application areas of the present disclosure may include domains that utilize external service providers (for example, software development, database management system, machine learning, inventory management, or the like).

Figure Description:

FIG. 1 is a graph that illustrates a composition of an executable graph-based model 100, in accordance with an embodiment of the present disclosure. Referring to FIG. 1, the executable graph-based model 100 is generally formed of a data structure (e.g., a graph-based model or a graphical model) comprising a plurality of nodes 102-106 which can be functionally extended with processing logic via the use of overlays. For example, as shown in FIG. 1, the nodes 104 and 106 are functionally extended with processing logic via the use of overlays 108 and 110, respectively. Although not shown, it will be apparent to a person skilled in the art that the node 102 can be similarly extended with processing logic via the use of one or more overlays. Each overlay includes processing logic, such as processing logic 112 and 114 which are associated with the overlays 108 and 110, respectively. At run-time, data, such as data 116 and 118, is associated with the nodes 102 and 106, respectively. Further, the overlays 108 and 110 of the nodes 104 and 106, respectively, provide the functionality to respond to stimuli and interact with, manipulate, or otherwise process the data for analytics based on the stimuli. Further, the node 104 inherits the node 102, and hence, also inherits the data 116 which is associated with the node 102. In some embodiments, the node 102 may be extended to have one or more overlays. In such embodiments, the node 104 may further inherit the overlays of the node 102.

Each element within the executable graph-based model 100 (both the data and the processing functionality) is implemented by way of a node. A node forms the fundamental building block of all executable graph-based models. A node may be an executable node. A node that is extended by way of an overlay node forms an executable node. One or more nodes are extended to include overlays in order to form the executable graph-based model 100. As such, the executable graph-based model 100 includes one or more nodes that can be dynamically generated, extended, or processed by one or more other modules within an overlay system (shown in FIG. 2).

Notably, the structure and functionality of the data processing are separate from the data itself when offline (or at rest) and are combined dynamically at run-time. The executable graph-based model 100 thus maintains the separability of the data and the processing logic when offline. Moreover, by integrating the data and the processing logic within a single model, processing delays or latencies are reduced because the data and the processing logic exist within the same logical system. Therefore, the executable graph-based model 100 applies to a range of time-critical systems where efficient processing of the stimuli is required.

Figure 2:
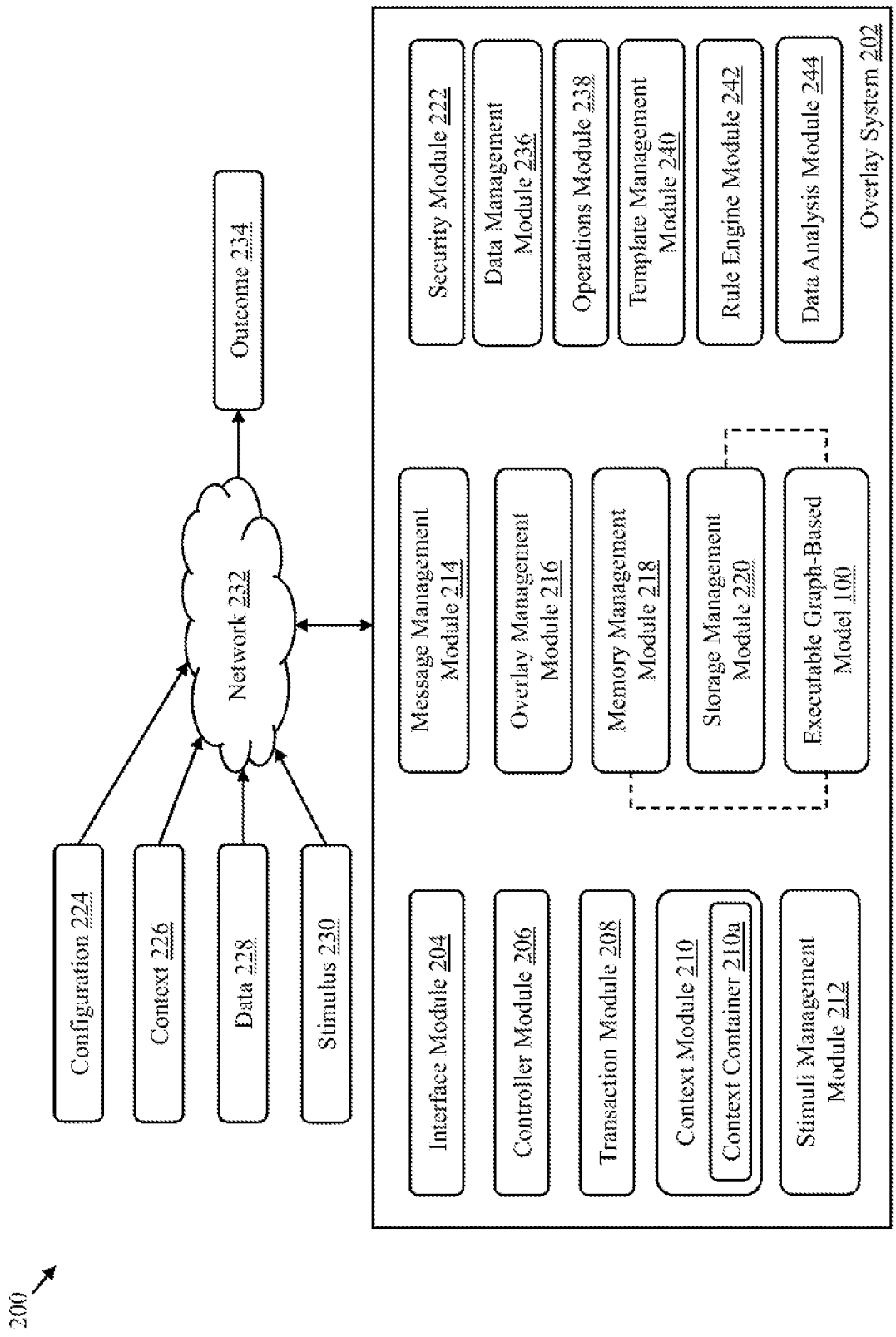
FIG. 2 is a block diagram that illustrates a system environment of an overlay system for execution, management, and configuration of executable graph-based models, in accordance with an embodiment of the present disclosure.

FIG. 2 is a block diagram that illustrates a system environment 200 of an overlay system 202 for execution, management, and configuration of executable graph-based models, in accordance with an embodiment of the present disclosure. Referring to FIG. 2, the overlay system 202 includes the executable graph-based model 100. The overlay system 202 further includes an interface module 204, a controller module 206, a transaction module 208, a context module 210, a stimuli management module 212, a message management module 214, an overlay management module 216, a memory management module 218, a storage management module 220, and a security module 222. FIG. 2 further shows a configuration 224, a context 226, data 228, a stimulus 230, a network 232, and an outcome 234. Additionally, the overlay system 202 of the present disclosure includes a data management module 236, an operations module 238, a template management module 240, a rule engine module 242, and a data analysis module 244. In some embodiments, all the modules of the overlay system 202 except for the executable graph-based model 100 may collectively form processing circuitry that performs in-situ data analysis in the overlay system 202. The data analysis may be executed for performing data quality analysis, data profiling, data grouping, data filtration, data normalization, data quality report, data auditing, data assessment, a combination of these, and/or any other operation on the data being analyzed within the overlay system 202.

The overlay system 202 may include suitable logic, circuitry, interfaces, and/or code, executable by the circuitry, that may be configured to facilitate in-situ data analysis in the executable graph-based models (such as, the executable graph-based model 100). Data analysis may be performed to determine completeness, uniqueness, consistency, accuracy, and conformity, associated with a dataset being analyzed. The dataset may be associated with the overlay node 202. The terms completeness, uniqueness, consistency, accuracy, and conformity, associated with the dataset being analyzed are described in detail in conjunction with FIG. 4.

The overlay system 202 includes the executable graph-based model 100 that corresponds to an application-specific combination of data and processing functionality which is manipulated, processed, and/or otherwise handled by the other modules within the overlay system 202 for performing analysis of data based on the stimulus 230 received by the overlay system 202.

The interface module 204 may include suitable logic, circuitry, interfaces, and/or code, executable by the circuitry, configured to provide a common interface between internal modules of the overlay system 202 and/or external sources. The interface module 204 provides an application programmable interface (API), scripting interface, or any other suitable mechanism for interfacing externally or internally with any module of the overlay system 202. The configuration 224, the context 226, the data 228, and the stimulus 230 may be received by the interface module 204 via the network 232. Similarly, outputs (e.g., the outcome 234) produced by the overlay system 202 are passed by the interface module 204 to the network 232 for consumption or processing by external systems. In one embodiment, the interface module 204 supports one or more messaging patterns or protocols such as the simple object access protocol (SOAP), the representational state transfer (REST) protocol, or the like. The interface module 204 thus allows the overlay system 202 to be deployed in any number of application areas, operational environments, or architecture deployments. Although not illustrated in FIG. 2, the interface module 204 is communicatively coupled (e.g., connected either directly or indirectly) to one or more other modules or elements within the overlay system 202 (such as the controller module 206, the context module 210, the executable graph-based model 100, or the like). In one embodiment, the interface module 204 is communicatively coupled (e.g., connected either directly or indirectly) to one or more overlays within the executable graph-based model 100.

The controller module 206 may include suitable logic, circuitry, interfaces, and/or code, executable by the circuitry, configured to handle and process interactions and executions within the overlay system 202. As will be described in more detail below, stimuli (such as the stimulus 230) and their associated contexts provide the basis for all interactions within the executable graph-based model 100. Processing of such stimuli may lead to execution of processing logic associated with one or more overlays within the executable graph-based model 100. The processing of the stimuli within the overlay system 202 may be referred to as a system transaction. The processing and execution of stimuli (and associated overlay execution) within the overlay system 202 is handled by the controller module 206. The controller module 206 manages all received input stimuli (e.g., the stimulus 230) and processes them based on a corresponding context (e.g., the context 226). The context 226 determines the priority that is to be assigned to processing of the corresponding stimulus by the controller module 206 or the context module 210. This allows each stimulus to be configured with a level of importance and prioritization within the overlay system 202.

The controller module 206 may maintain the integrity of the modules within the overlay system 202 before, during, and after a system transaction. The transaction module 208, which is associated with the controller module 206, is responsible for maintaining the integrity of the overlay system 202 through the lifecycle of a transaction. Maintaining system integrity via the controller module 206 and the transaction module 208 allows a transaction to be rolled back in an event of an expected or unexpected software or hardware fault or failure. The controller module 206 is configured to handle the processing of the stimulus 230 and transactions through architectures such as parallel processing, grid computing, priority queue techniques, or the like. In one embodiment, the controller module 206 and the transaction module 208 are communicatively coupled (e.g., connected either directly or indirectly) to one or more overlays within the executable graph-based model 100.

As stated briefly above, the overlay system 202 utilizes a context-driven architecture, whereby the stimulus 230 within the overlay system 202 is associated with the context 226 which is used to adapt the handling or processing of the stimulus 230 by the overlay system 202. That is to say that the handling or processing of the stimulus 230 is done based on the context 226 associated therewith. Hence, the stimulus 230 is a contextualized stimulus. The context 226 may include details such as user name, password, access token, device information, time stamp, one or more relevant identifiers (IDs), or the like, that are required for processing of stimulus within the executable graph-based model 100. Each context within the overlay system 202 may be extended to include additional information that is required for the processing of the stimulus (e.g., a query, a command, or an event).

The context module 210 may include suitable logic, circuitry, interfaces, and/or code, executable by the circuitry, configured to manage the handling of contexts within the overlay system 202. The context module 210 is responsible for processing any received contexts (e.g., the context 226) and translating the received context to an operation execution context. In some examples, the operation execution context is larger than the received context because the context module 210 supplements the received context with further information necessary for the processing of the received context. The context module 210 passes the operation execution context to one or more other modules within the overlay system 202 to drive communication of one or more messages associated with the operation execution context. Contexts within the overlay system 202 can be external or internal. While some contexts apply to all application areas and problem spaces, some applications may require specific contexts to be generated and used to process the received stimulus 230. As will be described in more detail below, the executable graph-based model 100 is configurable (e.g., via the configuration 224) so as only to execute within a given execution context for a given stimulus.

As shown, the context module 210 includes a context container 210a that includes a set of defined contexts. Each defined context pertains to a context that is associated with one or more operations for facilitating in-situ data analysis in the overlay system 202. That is to say that, one or more contexts of the set of defined contexts are indicative of one or more operations to be executed for performing one or more tasks to enable in-situ analysis of data associated with the overlay system 202. The set of defined contexts may include a rule creation context, a rule modification context, a rule deletion context, and/or a rule execution context. The rule creation context is indicative of one or more operations to be executed by one or more modules of the overlay system 202 to define a rule for facilitating data analysis of a dataset associated with the overlay system 202. The rule modification context is indicative of one or more operations to be executed by one or more modules of the overlay system 202 to modify an existing rule. The rule deletion context is indicative of one or more operations to be executed to delete the existing rule. The rule execution context is indicative of one or more operations to be executed by one or more modules of the overlay system 202 to execute the rule to evaluate the dataset associated with the overlay system 202.

The stimuli management module 212 may include suitable logic, circuitry, interfaces, and/or code, executable by the circuitry, configured to process externally received stimuli (e.g., the stimulus 230) and any stimuli generated internally from any module within the overlay system 202. The stimuli management module 212 is communicatively coupled (e.g., connected either directly or indirectly) to one or more overlays within the executable graph-based model 100 to facilitate the processing of stimuli within the executable graph-based model 100. The overlay system 202 utilizes different types of stimuli such as a command (e.g., a transactional request), a query, or an event received from an external system such as an Internet-of-Things (IoT) device. As previously stated, a stimulus (such as the stimulus 230) can be either externally or internally generated. In an example, the stimulus 230 may be a message that is internally triggered (e.g., generated) from any of the modules within the overlay system 202. Such internal generation of the stimulus 230 indicates that something has happened within the overlay system 202 and subsequent handling by one or more other modules within the overlay system 202 may be required. Internal stimulus 230 can also be triggered (e.g., generated) from the execution of processing logic associated with overlays within the executable graph-based model 100. In another example, the stimulus 230 may be externally triggered and may be generated based on an input received via a user interface associated with the controller module 206. The externally triggered stimulus 230 may be received in the form of a textual, audio, or visual input. The externally triggered stimulus 230 may be associated with the intent of a user to execute an operation indicated by the stimulus 230. The operation is executed in accordance with information included in the context 226 associated with the stimulus 230.

The stimuli management module 212 may receive the stimuli (such as the stimulus 230) in real-time or near-real-time and communicate the received stimuli to one or more other modules or nodes of the executable graph-based model 100. In some examples, the stimuli are scheduled in a batch process. The stimuli management module 212 utilizes any suitable synchronous or asynchronous communication architectures or approaches in communicating the stimuli (along with associated information). The stimuli within the overlay system 202 are received and processed (along with a corresponding context) by the stimuli management module 212, which then determines the processing steps to be performed for the communication of messages associated with each stimulus. In one embodiment, the stimuli management module 212 processes the received stimuli in accordance with a predetermined configuration (e.g., the configuration 224) or dynamically determines what processing needs to be performed based on the contexts associated with the stimuli and/or based on a state of the executable graph-based model 100. The state of the executable graph-based model 100 refers to the current state of each node of the executable graph-based model 100 at a given point in time. The state of the executable graph-based model 100 is dynamic, and hence, may change based on the execution of a message by any of its nodes. In some examples, the processing of a stimulus (such as, the stimulus 230) results in the generation, communication, or processing of one or more messages that further result in one or more outcomes (e.g., the outcome 234) being generated. Such outcomes are either handled internally by one or more modules in the overlay system 202 or communicated via the interface module 204 as an external outcome. In one embodiment, all stimuli and corresponding outcomes are recorded for auditing and post-processing purposes by, for example, the operations module 238 of the overlay system 202.

The message management module 214 may include suitable logic, circuitry, interfaces, and/or code, executable by the circuitry, configured to manage all data or information associated with messages (e.g., the data 228) communicated within the overlay system 202 for a given communication network implemented by way of the executable graph-based model 100. Operations performed by the message management module 214 include data loading, data unloading, data modeling, and data processing operations associated with the generation and communication of messages within the overlay system 202. The message management module 214 is communicatively coupled (e.g., connected either directly or indirectly) to one or more other modules within the overlay system 202 to complete some or all of these operations. For example, the storage of data or information associated with messages is handled in conjunction with the storage management module 220 (as described in more detail below).

The overlay management module 216 may include suitable logic, circuitry, interfaces, and/or code, executable by the circuitry, configured to manage all overlays within the overlay system 202. Operations performed by the overlay management module 216 include overlay storage management, overlay structure modeling, overlay logic creation and execution, and overlay loading and unloading (within the executable graph-based model 100). The overlay management module 216 is communicatively coupled (e.g., connected either directly or indirectly) to one or more other modules within the overlay system 202 to complete some or all of these operations. For example, overlays can be persisted in some form of physical storage using the storage management module 220 (as described in more detail below). As a further example, overlays can be compiled and preloaded into memory via the memory management module 218 for faster run-time execution.

The memory management module 218 may include suitable logic, circuitry, interfaces, and/or code, executable by the circuitry, configured to manage and optimize the memory usage of the overlay system 202. The memory management module 218 thus helps to improve the responsiveness and efficiency of the processing performed by one or more of the modules within the overlay system 202 by optimizing the memory handling performed by these modules. The memory management module 218 uses direct memory or some form of distributed memory management architecture (e.g., a local or remote caching solution). Additionally, or alternatively, the memory management module 218 deploys multiple different types of memory management architectures and solutions (e.g., reactive caching approaches such as lazy loading or a proactive approach such as write-through cache may be employed). These architectures and solutions are deployed in the form of a flat (single-tiered) or multi-tiered caching architecture where each layer of the caching architecture can be implemented using a different caching technology or architecture solution approach. In such implementations, each cache or caching tier can be configured (e.g., by the configuration 224) independent of the requirements for one or more modules of the overlay system 202. For example, data priority and an eviction strategy, such as least-frequently-used (LFU) or least-recently-used (LRU), can be configured for all or parts of the executable graph-based model 100. In one embodiment, the memory management module 218 is communicatively coupled (e.g., connected either directly or indirectly) to one or more overlays within the executable graph-based model 100.

The storage management module 220 may include suitable logic, circuitry, interfaces, and/or code, executable by the circuitry, configured to manage the temporary or permanent storage of data associated with messages being communicated within the overlay system 202. The storage management module 220 is any suitable low-level storage device solution (such as a file system) or any suitable high-level storage technology such as another database technology (e.g., relational database management system (RDBMS) or NoSQL database). The storage management module 220 is directly connected to the storage device upon which the relevant data is persistently stored. For example, the storage management module 220 can directly address the computer-readable medium (e.g., hard disk drive, external disk drive, or the like) upon which the data is being read or written. Alternatively, the storage management module 220 is connected to the storage device via a network such as the network 232. As will be described in more detail later in the present disclosure, the storage management module 220 uses manifests to manage the interactions between the storage device and the modules within the overlay system 202. In one embodiment, the storage management module 220 is communicatively coupled (e.g., connected either directly or indirectly) to one or more overlays within the executable graph-based model 100.

As described, storage, loading, and unloading of the executable graph-based model 100 or one or more components thereof is facilitated by the memory management module 218 and the storage management module 220. The memory management module 218 and the storage management module 220 may facilitate such operations by interacting with the storage device. In the present disclosure, the executable graph-based model 100 may be stored in a storage element. The storage element corresponds to a combination of the memory management module 218 and storage management module 220 that may be configured to store the executable graph-based model 100. In some embodiments, the storage element may be a storage module that is managed by the memory management module 218 and storage management module 220, collectively.

The security module 222 may include suitable logic, circuitry, interfaces, and/or code, executable by the circuitry, configured to manage the security of the overlay system 202. This includes the security at a system level and a module level. Security is hardware-related, network-related, or software-related depending on the operational environment, the architecture of the deployment, or the data and information contained within the overlay system 202. For example, if the system is deployed with a web-accessible API (as described above in relation to the interface module 204), the security module 222 can enforce a hypertext transfer protocol secure (HTTPS) protocol with the necessary certification. As a further example, if the data or information associated with the message received or processed by the overlay system 202 contains Personally Identifiable Information (PII) or Protected Health Information (PHI), the security module 222 can implement one or more layers of data protection to ensure that the PII or PHI are correctly processed and stored. In an additional example, in implementations whereby the overlay system 202 operates on United States of America citizen medical data, the security module 222 may enforce additional protections or policies as defined by the United States Health Insurance Portability and Accountability Act (HIPAA). Similarly, if the overlay system 202 is deployed in the European Union (EU), the security module 222 may enforce additional protections or policies to ensure that the data processed and maintained by the overlay system 202 complies with the General Data Protection Regulation (GDPR). In one embodiment, the security module 222 is communicatively coupled (e.g., connected either directly or indirectly) to one or more overlays within the executable graph-based model 100, thereby directly connecting security execution to the data/information in the executable graph-based model 100. The security module 222 thus acts as a centralized coordinator that works in conjunction with the message management module 214 and the overlay management module 216 for managing and executing security-based overlays.

The data management module 236 may include suitable logic, circuitry, interfaces, and/or code, executable by the circuitry, configured to manage all data or information within the overlay system 202 (e.g., the data 228) for a given application. Operations performed by the data management module 236 include data loading, data unloading, data modeling, and data processing. The data management module 236 is communicatively coupled (e.g., connected either directly or indirectly) to one or more other modules within the overlay system 202 to complete some or all of these operations. For example, data storage is handled by the data management module 236 in conjunction with the storage management module 220.

The operations module 238 may include suitable logic, circuitry, interfaces, and/or code, executable by the circuitry, configured to track operational metrics and the behavior of all modules of the overlay system 202. Operational metrics of a module is indicative of statistics associated with performance of the module while performing an operation (for example, communication, data processing, stimulus processing, or the like).

The template management module 240 may include suitable logic, circuitry, interfaces, and/or code, executable by the circuitry, configured to enable the overlay system 202 to implement a templated version of one or more nodes of the executable graph-based model 100. The template management module 240 may be configured to create one or more predefined templates in the executable graph-based model 100. The template management module 240 may be further configured to generate one or more node instances of the predefined templates for the implementation of templated version of the executable graph-based model 100. Notably, the template management module 240 ensures ontology integrity by enforcing structure and rules of a template when generating instances of the template at run-time. Ontology integrity refers to consistency, accuracy, and correctness of an ontology. Thus, the template management module 240 ensures that the consistency, accuracy, and correctness of the ontology of the executable graph-based model 100 is maintained while generating the instances of the template at run-time. The template management module 240 may be communicatively coupled (i.e., connected either directly or indirectly) to one or more nodes and/or one or more overlays within the executable graph-based model 100.

The rule engine module 242 may include suitable logic, circuitry, interfaces, and/or code, executable by the circuitry, configured to facilitate execution of one or more rules for performing data analysis of the dataset associated with the overlay system 202. The rule engine module 242 is further configured to facilitate storage and persistence of the one or more rules. The rule engine module 242 is further configured to facilitate mapping of the one or more rules with a corresponding overlay node (for example, a rule overlay node). In an instance, when an ontology of the dataset undergoes a modification, the rule engine module 242 is configured to update the rules to conform with the modifications in the ontology.

The data analysis module 244 may include suitable logic, circuitry, interfaces, and/or code, executable by the circuitry, configured to perform data analysis of the dataset associated with the overlay system 202. The data analysis module 244 may perform such analysis based on outputs of the rules executed by the rule engine module 242. Therefore, the data analysis module 244 is communicatively coupled to the rule engine module 242. Further, the data analysis module 244 may perform the analysis to evaluate the dataset based on data analysis parameters associated with the rules. Such data analysis parameters may include, but are not limited to, a completeness parameter, a uniqueness parameter, a consistency parameter, an accuracy parameter, and a conformity parameter. Further, based on the data analysis of the dataset, the data analysis module 244 may (i) determine data quality of the dataset, (ii) profile, categorize, classify, or group the dataset and/or data elements of the dataset, (iii) make an assessment regarding the dataset, and/or (iv) generate a data analysis report based on the data analysis of the dataset.

The functionality of two or more of the modules included in the overlay system 202 may be combined within a single module. Conversely, the functionality of a single module can be split into two or more further modules which can be executed on two or more devices. The modules described above in relation to the overlay system 202 can operate in a parallel, distributed, or networked fashion. The overlay system 202 may be implemented in software, hardware, or a combination of both software and hardware. Examples of suitable hardware modules include a general-purpose processor, a field programmable gate array (FPGA), and/or an application-specific integrated circuit (ASIC). Software modules can be expressed in a variety of software languages such as C, C++, Java, Ruby, Visual Basic, Python, and/or other object-oriented, procedural, or programming languages.

It will be apparent to a person skilled in the art that whilst only one executable graph-based model 100 is shown in FIG. 2, in other embodiments, the overlay system 202 stores and maintains more than one executable graph-based model, without deviating from the scope of the present disclosure. In such embodiments, communication in each executable graph-based model is executed in a manner that is similar to the executable graph-based model 100.

Having described the overlay system 202 for executing and managing executable graph-based models, the description will now turn to the elements of an executable graph-based model; specifically, the concept of a node. Unlike conventional graph-based systems, all elements (e.g., data, overlays, etc.) within the executable graph-based model (e.g., the executable graph-based model 100) are implemented as nodes. As will become clear, this allows executable graph-based models to be flexible, extensible, and highly configurable.

Figure 3A:
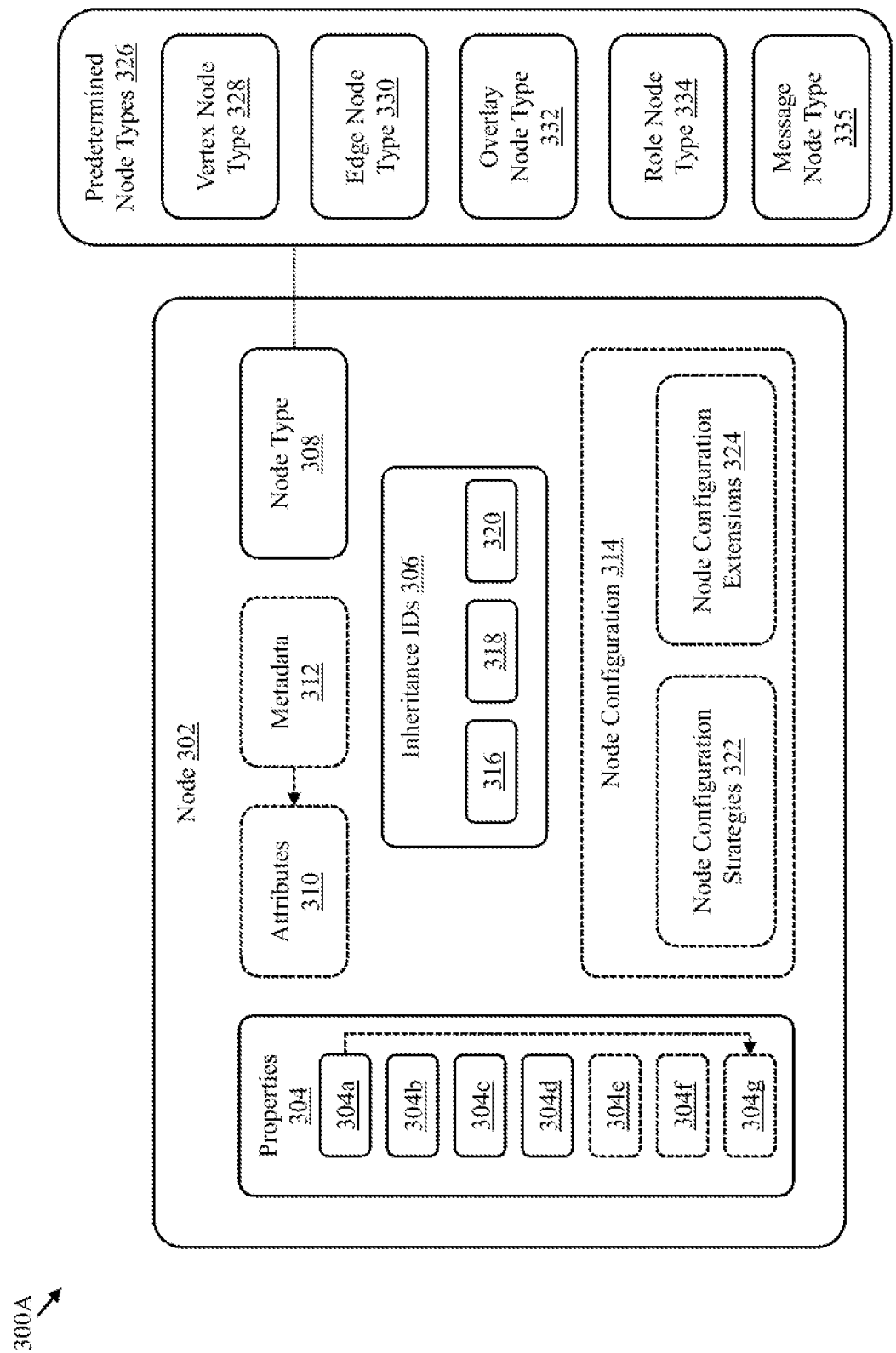
FIG. 3A is a block diagram that illustrates a generic structure of a node within the executable graph-based model, in accordance with an embodiment of the present disclosure.

FIG. 3A is a block diagram 300A that illustrates a generic structure of a node 302 within the executable graph-based model 100, in accordance with an embodiment of the present disclosure. Referring to FIG. 3A, the node 302 corresponds to the core structure of the executable graph-based model 100 and forms the foundational building block for all data and processing logic within the executable graph-based model 100. The node 302 includes properties 304, inheritance IDs 306, and a node type 308. The node 302 optionally includes one or more attributes 310, metadata 312 associated with the attributes 310, and a node configuration 314.

The properties 304 of the node 302 include a unique ID 304a, a version ID 304b, a namespace 304c, and a name 304d. The properties 304 optionally include one or more icons 304e, one or more labels 304f, and one or more alternative IDs 304g. The inheritance IDs 306 of the node 302 include an abstract flag 316, a leaf flag 318, and a root flag 320. The node configuration 314 optionally includes one or more node configuration strategies 322 and one or more node configuration extensions 324.

The unique ID 304a is unique for each node within the executable graph-based model 100. The unique ID 304a is used to register, manage, and reference the node 302 within the system (e.g., the overlay system 202). In some embodiments, the one or more alternative IDs 304g are associated with the unique ID 304a to help manage communications and connections with external systems (e.g., during configuration, sending stimuli, or receiving outcomes). The version ID 304b of the node 302 is incremented when the node 302 undergoes transactional change. This allows the historical changes between versions of the node 302 to be tracked by modules or overlays within the overlay system 202. The namespace 304c of the node 302, along with the name 304d of the node 302, is used to help organize nodes within the executable graph-based model 100. That is, the node 302 is assigned a unique name 304d within the namespace 304c such that the name 304d of the node 302 need not be unique within the entire executable graph-based model 100, only within the context of the namespace 304c to which the node 302 is assigned. The node 302 optionally includes one or more icons 304e which are used to provide a visual representation of the node 302 when visualized via a user interface. The one or more icons 304e can include icons at different resolutions and display contexts such that the visualization of the node 302 is adapted to different display settings and contexts. The node 302 also optionally includes one or more labels 304f which are used to override the name 304d when the node 302 is rendered or visualized.

The node 302 supports the concept of inheritance of data and processing logic associated with any other node of the executable graph-based model 100 that is inherited by the node 302. This allows the behavior and functionality of the node 302 to be extended or derived from the inherited node of the executable graph-based model 100. The inheritance IDs 306 of the node 302 indicate the inheritance-based information, which may apply to the node 302. The inheritance IDs 306 comprise a set of Boolean flags which identify the inheritance structure of the node 302. The abstract flag 316 allows the node 302 to support the construct of abstraction. When the abstract flag 316 takes a value 'true', the node 302 is flagged as abstract that is to say that it cannot be instantiated or created within an executable graph-based model (e.g., the executable graph-based model 100). Thus, in an instance when the node 302 has the abstract flag 316 set to 'true', the node 302 may only form the foundation of other nodes that inherit therefrom. By default, the abstract flag 316 of the node 302 is set to 'false'. The leaf flag 318 is used to indicate whether any other node may inherit from the node 302. If the leaf flag 318 is set to 'true', then no other node may inherit from the node 302 (but unlike an abstract node, a node with the leaf flag 318 set may be instantiated and created within the executable graph-based model 100). The root flag 320 is used to indicate whether the node 302 inherits from any other node. If the root flag 320 is set to 'true', the node 302 does not inherit from any other node. The node 302 is flagged as leaf (e.g., the leaf flag 318 is set to 'true') and/or root (e.g., the root flag 320 is set to 'true'), or neither (e.g., both the leaf flag 318 and the root flag 320 are set to 'false'). It will be apparent to a person skilled in the art that a node cannot be flagged as both abstract and leaf (e.g., the abstract flag 316 cannot be set to 'true' whilst the leaf flag 318 is set to 'true').

As stated above, all elements of the executable graph-based model 100 are defined as nodes. This functionality is in part realized due to the use of a node type. The node type 308 of the node 302 is used to extend the functionality of the node 302. All nodes within the executable graph-based model 100 comprise a node type that defines additional data structures and implements additional executable functionality. A node type thus includes data structures and functionality that are common across all nodes that share that node type. The composition of a node with a node type therefore improves extensibility by allowing the generation of specialized node functionalities for specific application areas. Such extensibility is not present in prior art graph-based models. As illustrated in FIG. 3A, the node 302 and the node type 308 are one logical unit that is not separated in the context of an executing system at run-time (e.g., in the context of execution of an executable graph-based model).

FIG. 3A further shows the plurality of predetermined node types 326 which provides a non-exhaustive list of node types for the node type 308 associated with the node 302. The plurality of predetermined node types 326 includes a vertex node type 328 and an edge node type 330. The vertex node type 328 (also referred to as a data node type or a value node type) includes common data structures and functionality related to the 'things' modeled in the graph (e.g., the data). The edge node type 330 includes common data structures and functionality related to joining two or more nodes. A node having the edge node type 330 may connect two or more nodes and thus the edge node type 330 constructs associations and connections between nodes (for example, objects or 'things') within the executable graph-based model 100. The edge node type 330 is not restricted to the number of nodes that can be associated or connected by a node having the edge node type 330. The data structures and functionality of the edge node type 330 thus define a hyper-edge which allows two or more nodes to be connected through a defined set of roles. A role defines a connective relationship between the two or more nodes, and hence, allows an edge node to connect two or more nodes such that the two or more nodes may have more than one relationship therebetween.

The plurality of predetermined node types 326 further includes the overlay node type 332, the role node type 334, and a message node type 335. As will be described in more detail below, a node with the overlay node type 332 is used to extend the functionality of a node, such as the node 302, to incorporate processing logic. Unlike non-overlay nodes, an overlay node includes processing logic which determines the functionality of the overlay node. The processing logic of an overlay node includes a block of executable code, or instructions, which carries out one or more operations associated with the communication of messages within the executable graph-based model 100. The block of executable code is pre-compiled code, code that requires interpretation at run-time, or a combination of both. Different overlay nodes provide different processing logic to realize different functionality. For example, a rule overlay node includes a set of rules and processing logic to execute the set of rules to evaluate the dataset associated with the overlay system 202 based on the set of data analysis parameters. Similarly, a data analysis overlay node includes processing logic to use a set of outputs of the set of rules executed by the rule overlay node to determine whether the dataset satisfies the set of data analysis parameters.

The role node type 334 defines a connective relationship between two nodes, for example, an edge node and a first vertex node. A node with the role node type 334 defines a relationship without expressly defining the first vertex node to which the edge node connects. A number of roles (and thus a number of connections) that an edge node type can have is not limited. A node with the message node type 235 refers to a node that represents a message associated with the overlay system 202.

A composition of a node (for example, the vertex node type 328, the message node type 235, or the like) corresponds to a plurality of attribute values for a plurality of attributes associated therewith. The plurality of attribute values, collectively, form data and transactional information associated with the node. In an example, a first plurality of attribute values for the plurality of attributes of a node with the vertex node type 328 may represent data stored at the node. In another example, a second plurality of attribute values for the plurality of attributes of another node with the message node type 335 may represent data and transactional information associated with a message represented by the node.

The one or more attributes 310 correspond to the data associated with the node 302 (e.g., the data represented by the node 302 within the executable graph-based model 100 as handled by the data management module 236). Notably, a node in the executable graph-based model 100 that is not associated with data may not have any attributes. The one or more attributes 310 represent a complex data type. Each attribute of the one or more attributes 310 is composed of an attribute behavior. Attribute behavior may be one of a standard attribute behavior, a reference attribute behavior, a derived attribute behavior, and a complex attribute behavior. The attribute behavior of each attribute defines the behavior of the corresponding attribute. The attribute behaviors of each attribute may be configured by associated attribute configurations. The attribute configurations are examples of attribute configuration extensions which are node configuration extensions (e.g., they are part of the one or more node configuration extensions 324 of the node 302 shown in FIG. 3A). The standard attribute behavior may be configured by a standard attribute configuration, the reference attribute behavior may be configured by a reference attribute configuration, the derived attribute behavior is configured by a derived attribute configuration, and the complex attribute behavior is configured by a complex attribute configuration.

The attribute behavior defines the behavior of the corresponding attribute. The standard attribute behavior is a behavior that allows read-write access to the data of the corresponding attribute. The reference attribute behavior is a behavior that allows read-write access to the data of the corresponding attribute but restricts possible values of the data to values defined by a reference data set. The reference attribute configuration associated with the reference attribute behavior includes appropriate information to obtain a reference data set of possible values. The derived attribute behavior is a behavior that allows read only access to data of the corresponding attribute. Also, data of the corresponding attribute is derived from other data or information, within the executable graph-based model 100 in which an executable node of the corresponding attribute is used. The data is derived from one or more other attributes associated with the node or is derived from more complex expressions depending on the application area. In one embodiment, the derived attribute configuration (which is used to configure the derived attribute behavior) includes mathematical and/or other forms of expressions (e.g., regular expressions, templates, or the like) that are used to derive the data (value) of the corresponding attribute. The complex attribute behavior is a behavior that allows the corresponding attribute to act as either a standard attribute behavior if the data of the corresponding attribute is directly set, or a derived attribute behavior if the data of the corresponding attribute is not directly set.

As shown, the node 302 further includes the metadata 312 (e.g., data stored as a name, a count of processed messages, time when last message was processed, an average processing time required for processing a message, or the like) which is associated with either the node 302 or an attribute (for example, the one or more attributes 310) of the node 302. An attribute within the one or more attributes 310 may either have an independent state or a shared state. That is to say that, an attribute may be a value shared attribute or a non-value shared attribute. An independent attribute has data that is not shared with any other node within the executable graph-based model 100. Conversely, a shared attribute has data that is shared with one or more other nodes within the executable graph-based model 100. For example, if two nodes within the executable graph-based model 100 comprise a shared-data attribute with a value state shared by both nodes, then updating the data (e.g., the value) of this shared attribute will be reflected across both nodes.

The node configuration 314 provides a high degree of configurations for the different elements of the node 302. The node configuration 314 optionally includes the one or more node configuration strategies 322 and/or the one or more node configuration extensions 324 which are complex data types. An example of a concrete node configuration strategy is an ID strategy, associated with the configuration of the unique ID 304a of the node 302, which creates message source IDs. A further example of a concrete node configuration strategy is a versioning strategy, associated with the configuration of the version ID 304b of the node 302, which supports major and minor versioning (depending on the type of transactional change incurred by the node 302). The versioning strategy may be adapted to a native filing system of a user device hosting the overlay system 202 or a third-party data storage (for example, Snowflake®, or the like) associated with the overlay system 202.

Figure 3B:
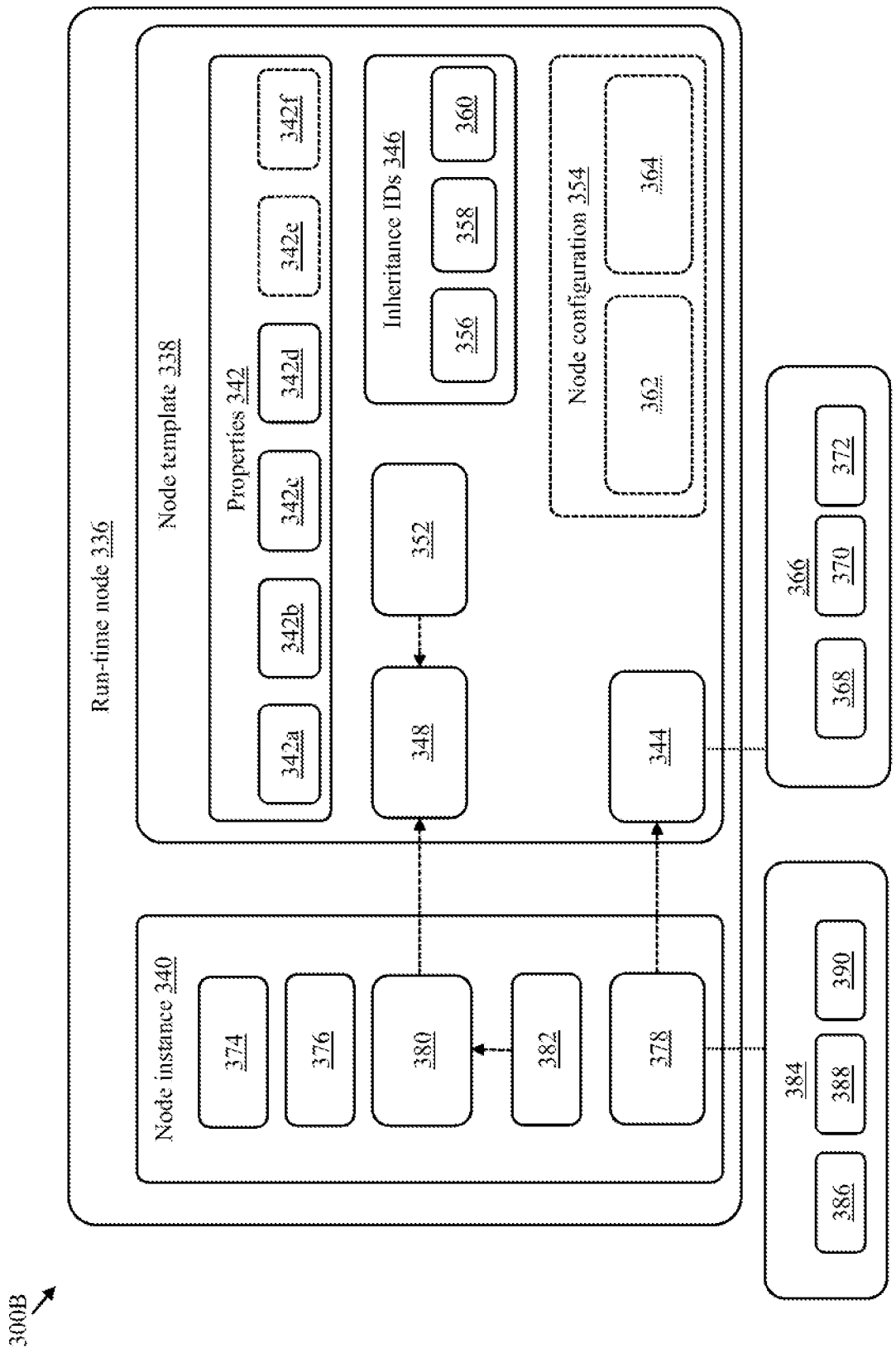
FIG. 3B is a block diagram that illustrates a generic structure of a run-time node within the executable graph-based model, in accordance with an embodiment of the present disclosure.

FIG. 3B is a block diagram 300B that illustrates a generic structure of a run-time node 336 within the executable graph-based model 100, in accordance with an embodiment of the present disclosure. Referring to FIG. 3B, the run-time node 336 corresponds to the core structure of the executable graph-based model 100 and forms the foundational building block for all data and processing logic within the executable graph-based model 100. The run-time node 336 is shown to include a node template 338 and a node instance 340. The node instance 340 is generated according to the node template 338. The node template 338 forms a data structure for the node instance 340. The run-time node 336 is shown in FIG. 3B is a compositional structure that is generated and executed, at run-time as part of the executable graph-based model 100. In other words, the node template 338 is defined as 'offline' and the node instance 340 and the run-time node 336 are run-time structures that are dynamically generated during execution of the executable graph-based model 100.

The node template 338 comprises a predetermined node structure. Further, the node template 338 defines one or more rules that govern the generation of the node instance 340. The node instance 340 is an implementation of the node template 338. In other words, the node instance 340 is generated based on the predetermined node structure and the one or more rules of the node template 338. The node template 338 cannot be modified during the execution but may be modified during offline mode or at rest. During execution, only the node instance 340 of the run-time node 336 may be modified.

The node template 338 includes properties 342, a node type template 344, inheritance IDs 346, and a set of attribute templates 348. The node template 338 may optionally include metadata 352 and node configuration 354. The properties 342 of the node template 338 include a unique identifier (ID) 342a, a version ID 342b, a namespace 342c, a name 342d, and optionally include one or more icons 342e and a set of labels 342f. The inheritance IDs 346 comprise an abstract flag 356, a leaf flag 358, and a root flag 360. The node configuration 354 optionally comprises one or more node configuration strategies 362 and/or one or more node configuration extensions 364. FIG. 3B further shows a plurality of predetermined node type templates 366. The plurality of predetermined node type templates 366 includes a vertex node type template 368, an edge node type template 370, and an overlay node type template 372. Further, the node instance 340 includes a unique ID 374, a version ID 376, a node type instance 378, and a set of attribute instances 380. The node instance 340 may optionally include metadata 382. FIG. 3B further shows a plurality of predetermined node type instances 384. The plurality of predetermined node type instances 384 include a vertex node type instance 386, an edge node type instance 388, and an overlay node type instance 390.

The unique ID 342a is unique for each node template within the executable graph-based model 100. Similarly, the unique ID 374 is unique for each node instance within the executable graph-based model 100. The unique ID 342a and the unique ID 374 are used to register, manage, and reference the node template 338 and the node instance 340, respectively, within the overlay system 202. The version ID 342b of the node template 338 is incremented when the node template 338 undergoes transactional change. Similarly, the version ID 376 of the node instance 340 is incremented when the node instance 340 undergoes transactional change. The namespace 342c of the node template 338, along with the name 308d of the node template 338, is used to help organize node templates within the executable graph-based model 100. That is, the node template 338 is assigned a unique name 342d within the namespace 342c such that the name 342d of the node template 338 need not be unique within the entire executable graph-based model 100, only within the context of the namespace 342c to which the node template 338 is assigned. The node template 338 optionally comprises one or more icons 342e which are used to provide a visual representation of the node template 338. The one or more icons 342e can include icons at different resolutions and display contexts such that the visualization of the node is adapted to different display contexts and settings. The node template 338 also optionally comprises the set of labels 342f which are used to override the name 342d when the node template 338 is rendered or visualized.

The node template 338 supports the software development feature of multiple inheritance by maintaining references (not shown) to zero or more other node templates, which then act as the base of the node template 338. This allows the behavior and functionality of a node template to be extended or derived from one or more other node templates within an executable graph-based model. The node instance 340 likewise supports multiple inheritance because it is an instance representation of the node template 338. The multiple inheritance structure of the node instance 340 is, however, limited to the corresponding instance realization of the multiple inheritance structure defined by the node template 338, i.e., one node instance 340 is created and managed for each node template 338 defined in the inheritance hierarchy for a node instance of a node template.

The inheritance IDs 346 of the node template 338 provide an indication of the inheritance-based information, which is applicable, or can be applicable, to the node template 338. The inheritance IDs 346 have a description that is similar to the inheritance IDs 306. The abstract flag 356 has a description that is similar to the abstract flag 316, the leaf flag 358 has a description that is similar to the leaf flag 318, and the root flag 360 has a description that is similar to the root flag 320.

All elements within the executable graph-based model 100 are defined as node templates or node instances. The functionality of the node template 338 and the node instance 340 are realized due to the use of the node type template 344 and the node type instance 378. The node type template 344 of the node template 338 is used to extend the functionality of the node template 338 by defining the standard set of capabilities, including data and associated behavior. The vertex node type template 368 (also referred to as a data node type) includes a template of common data structures and functionality related to the 'things' modeled in the graph (e.g., the data). The vertex node type instance 386 includes the common data structures and functionality related to the 'things' modeled in the graph based on the vertex node type template 368. The edge node type template 370 includes a template of common data structures and functionality related to joining two or more nodes. A node instance having the edge node type instance 388 may connect two or more nodes and thus the edge node type instance 388 constructs associations and connections between nodes (for example objects or 'things') within the executable graph-based model 100. The edge node type instance 388 is not restricted to the number of nodes that can be associated or connected by a node having the edge node type instance 388. The data structures and functionality of the edge node type instance 388 thus define a hyper-edge which allows two or more nodes to be connected through a defined set of roles. A role defines a connective relationship between the two or more nodes, and hence, allows an edge node to connect two or more nodes such that the two or more nodes may have more than one relationship therebetween. The plurality of predetermined node type templates 366 further includes the overlay node type template 372. The overlay node type template 372 is used to extend the functionality of a node template (e.g., the node template 338) to incorporate processing logic. Similarly, the overlay node type instance 390 is used to extend the functionality of a node instance (e.g., the node instance 340) to incorporate processing logic.

The set of attribute templates 348 corresponds to the data defined by the node template 338. For example, the set of attribute templates 348 may define the names and value types (e.g., integer, string, float, etc.) of one or more attributes but not the values of these attributes. The values of the set of attribute templates 348 may be defined by the set of attribute instances 380 of the node instance 340 through one or more values or instance values. For example, the node template 338 may define a string attribute 'surname' and the corresponding node instance 340 may assign the instance value 'Bell-Richards' to this string attribute. Each attribute instance of the set of attribute instances 380 is associated with an attribute template of the set of attribute templates 348. The node template 338 may define one or more default values for the set of attribute templates 348. The default values correspond to the values that the attributes take if no value is assigned. The metadata 352 (e.g., data stored as a name, a value type, and a value triplet) is associated with either the node template 338 or one or more of the set of attribute templates 348 of the node template 338. Similarly, the node instance 340 also optionally comprises the metadata 352 (e.g., data stored as a name, a value type, and a value triplet) which is associated with either the node instance 340 or one or more of the set of attribute instances 380.

The node configuration 354 provides a high degree of configurability for the different elements of a node template and/or a node instance. An example of a concrete node configuration strategy is an ID strategy, associated with the configuration of the unique ID 342a of the node template 338. A further example of a concrete node configuration strategy is a versioning strategy, associated with the configuration of the version ID 342b of the node template 338 which supports major and minor versioning (depending on the type of transactional change incurred). The versioning strategy may be adapted to a native filing system of a user device hosting the overlay system 202 or a third-party data storage (for example, Snowflake®, or the like) associated with the overlay system 202.

It will be apparent to a person skilled in the art that each node of the executable graph-based model 100 has a generic structure that is similar to the node 302 of FIG. 3A or the run-time node 336 of FIG. 3B.

Figure 4:
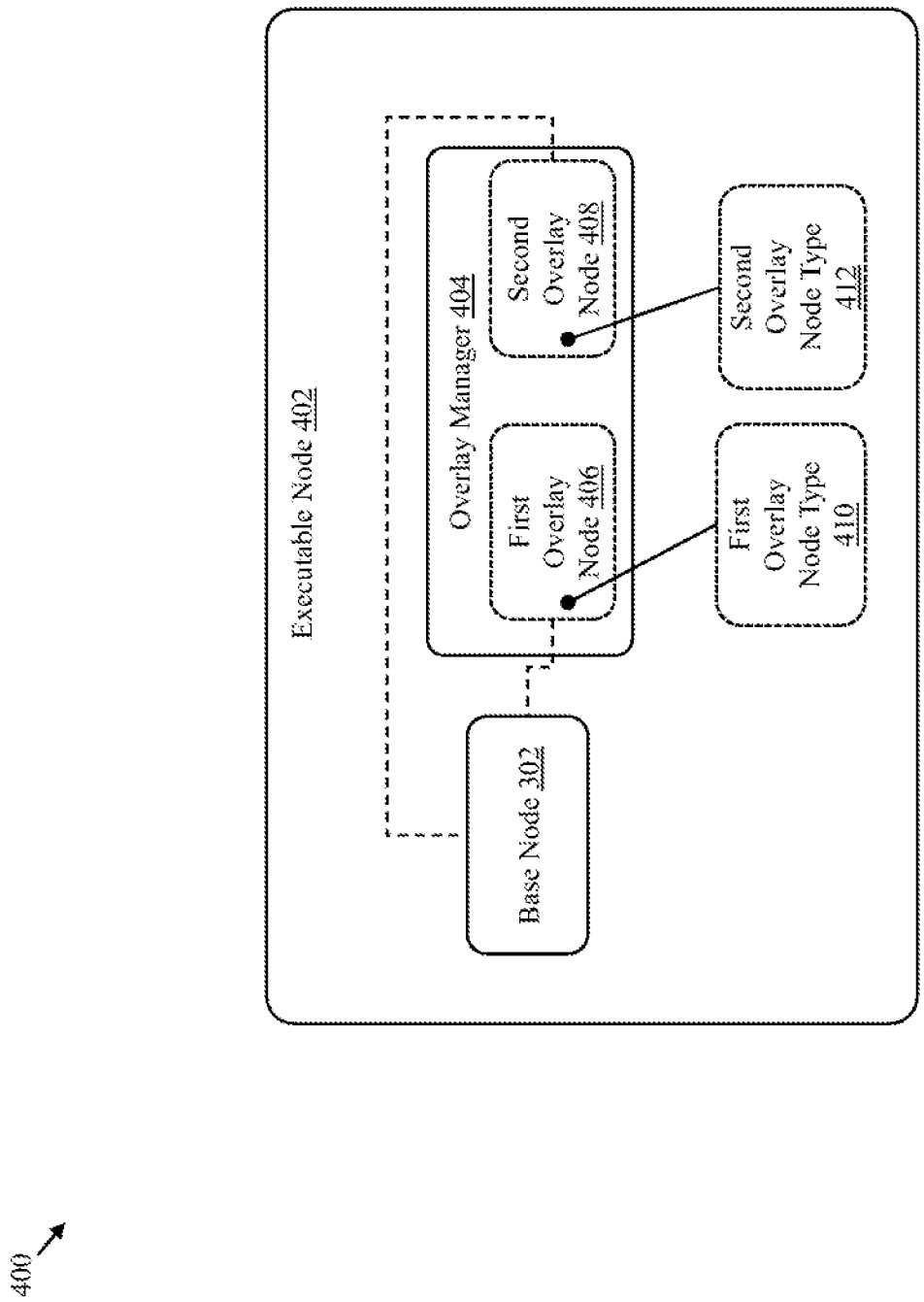
FIG. 4 is a block diagram that illustrates an executable node within the executable graph-based model, in accordance with an embodiment of the present disclosure.

FIG. 4 is a block diagram 400 that illustrates an executable node 402 within the executable graph-based model 100, in accordance with an embodiment of the present disclosure. Referring to FIG. 4, the executable node 402 is shown to include a base node (e.g., the node 302 or the run time node 336) and an overlay manager 404. For the sake of ongoing discussion, the base node corresponds to the node 302, and is hereinafter referred to as the "base node 302". However, the functionality of the executable node 402 for the base node corresponding to the run time node 336 may be similar to that for the base node corresponding to the node 302.

The overlay manager 404 includes a first overlay node 406 and a second overlay node 408. The executable node 402 provides processing functionality (e.g., processing logic) to the base node 302 via one or more associated overlay nodes (for example, the first and second overlay nodes 406 and 408). Beneficially, the data and processing capability of the base node 302 may be dynamically and significantly extended using the concept of an executable node (for example, the executable node 402). As shown, the first overlay node 406 has a first overlay node type 410 and the second overlay node 408 has a second overlay node type 412. Examples of overlay node type includes, but are not limited to, a rule overlay node type, a data analysis overlay node type, or the like.

A node with the rule overlay node type is a rule overlay node that includes a set of rules that when executed on the dataset associated with the overlay system 202 evaluates the dataset based on a corresponding set of data analysis parameters. The rule overlay node further includes processing logic to execute the set of rules. The set of data analysis parameters is indicative of a set of requirements of one or more system operations being executed by the overlay system 202 that is to be adhered to by the dataset to be usable for the execution of the one or more operations. Therefore, the dataset is evaluated based on the set of data analysis parameters to determine whether the dataset meets each requirement of the set of requirements. The dataset is usable for the one or more operations of the overlay system 202 when the dataset meets the set of requirements associated with the one or more operations. Notably, the overlay system 202 may execute a plurality of system operations that include operations being executed for a business solution that is implemented using the overlay system 202 or any operation associated with execution of the overlay system 202. Further, each system operation may require data that adheres to a corresponding set of requirements. Therefore, the data is analyzed based on the set of data analysis parameters to determine whether it is usable for a corresponding system operation.

Each rule of the set of rules is associated with one or more data analysis parameters of the set of data analysis parameters. Hence, the execution of the set of rules leads to generation of a set of outputs. That is to say that, execution of each rule of the set of rules generates an output that is indicative of an evaluation of the dataset based on one or more data analysis parameters of the set of data analysis parameters.

The set of data analysis parameters includes (i) the completeness parameter, (ii) the uniqueness parameter, (iii) the consistency parameter, (iv) the accuracy parameter, and (v) the conformity parameter. Each data analysis parameter refers to a property, a constraint, a condition, or the like, that is to be adhered to by the dataset so that it is usable for the one or more system operations being executed by the overlay system 202. In some embodiments, one or more of the set of data analysis parameters may be associated with a parameter context that is indicative of an objective, a criterion, or the like, associated with the data analysis parameter. In an example, a student dataset may be analyzed based on a data analysis parameter such as the completeness parameter. In such an example, the completeness parameter may be associated with the parameter context indicative of analysis of the student dataset to verify whether the student dataset includes all essential information associated with each student record.

The completeness parameter refers to a constraint that defines a data element of the dataset to be an essential data element. That is to say that, presence of the data element may be essential for the usability of the dataset. In an embodiment, the completeness parameter may be evaluated in terms of a percentage or a number of passed/failed data elements of the dataset. The dataset may be considered a complete dataset when the number of passed data elements is greater than a completeness threshold.

The uniqueness parameter refers to a constraint that ensures that there is no duplication of data elements within the dataset. In an embodiment, the uniqueness parameter may be evaluated in terms of a percentage or a number of passed/failed data elements of the dataset. The dataset may be considered as a unique dataset when the number of passed data elements is greater than a uniqueness threshold.

One or more data elements of the dataset may be also be included in other datasets of the overlay system 202. The consistency parameter refers to a constraint that ensures a value of the data element remains consistent/same in each dataset that includes the data element. In an embodiment, the consistency parameter may be evaluated in terms of a percentage or a number of passed/failed data elements of the dataset. The dataset may be considered as a consistent dataset when the number of passed data elements is greater than a consistency threshold.

The accuracy parameter refers to a degree to which the dataset correctly describes corresponding real-world object. The accuracy parameter is evaluated by verifying data elements of the dataset with an originating source or a trusted external source. In an embodiment, the accuracy parameter may be evaluated in terms of a percentage or a number of passed/failed data elements of the dataset. The dataset may be considered an accurate dataset when the number of passed data elements is greater than an accuracy threshold.

The conformity parameter refers to a constraint that defines a range for the value of the data element of the dataset. The dataset may not be usable for the one or more system operations being executed by the overlay system 202, when the value of the data element is outside the range. In an embodiment, the conformity parameter may be evaluated in terms of a percentage or a number of passed/failed data elements of the dataset. The dataset may be considered a conforming dataset when the number of passed data elements is greater than an accuracy threshold.

A passed data element refers to a data element that has an output 'success' generated based on execution of a rule with a data analysis parameter (for example, the completeness parameter, the uniqueness parameter, the consistency parameter, the accuracy parameter, and the conformity parameter, or the like) associated therewith.

The set of rules, included in the rule overlay node, may include a first subset of rules and a second subset of rules. The rule overlay node may generate a first subset of outputs for the first subset of rules and a second subset of outputs for the second subset of rules. The first subset of rules may correspond to essential rules that are essential to be passed by the dataset. In an instance, when any data element of the dataset fails any of the first subset of rules, the dataset may not be used by the overlay system 202. The second sub-set of rules may correspond to optional rules (i.e., non-essential rules). Compliance of the dataset with the second subset of rules may not be essential but preferable for the dataset to be usable for the one or more operations of the overlay system 202.

Each rule, of the set of rules, may be associated with a corresponding weight. Based on a weight of a rule being greater than a threshold weight, the rule is considered an essential rule and is included in the first subset of rules. Similarly, based on a weight of a rule being less than a threshold weight, the rule is considered an optional rule and is included in the second subset of rules.

In an embodiment, the rule overlay node may be a stateful rule overlay node or a stateless rule overlay node. Based on the rule overlay node being the stateful rule overlay node, the set of outputs associated with the set of rules may be stored and persisted with the rule overlay node. Based on the rule overlay node being the stateless rule overlay node, the set of outputs associated with the set of rules are not stored, and hence the, rules are required to be re-executed to re-generate the set of outputs.

A node with the data analysis overlay node type includes processing logic to be used to analyze the dataset to determine whether a data analysis score associated with the dataset exceeds a data analysis score threshold. The dataset is deemed to be usable only when the data analysis score associated with the dataset exceeds a data analysis score threshold. Each rule of the set of rules is associated with a corresponding rule threshold of the set of rule thresholds, and, the data analysis score is considered to be exceeding the data analysis score threshold, when each rule of the set of rules exceeds the corresponding rule threshold. For example, a rule that evaluates completeness of the dataset may have a rule threshold 'not null' that is to be exceeded by a data element of the dataset to pass the rule. In some embodiments, the data analysis overlay node may determine whether the data analysis score associated with the dataset exceeds the data analysis score threshold based on each output associated with the first subset of rules exceeding corresponding rule threshold. The data analysis score may be further indicative of the data quality of the dataset. That is to say that, the dataset is assumed to have good quality based on the data analysis score exceeding the data analysis threshold score.

The data analysis overlay node may further perform one or more post-analysis operations based on an outcome of the data analysis. The post-analysis operation may include determining a quality of the dataset, profiling the dataset, assessing the dataset, and generating data analysis report for the dataset. The quality of the dataset is assumed to be acceptable when the data analysis score associated with the dataset exceeds the data analysis score threshold. Further, the dataset is profiled based on a data type or data quality associated with the dataset. The data type refers to a category of data to which the dataset belongs. Examples of the data type may include maintenance data, user data, operational data, or the like. The data quality associated with the dataset may be excellent data quality, good data quality, average data quality, bad data quality, and/or very bad data quality. The dataset may be assessed to determine whether the dataset satisfies the requirements of the overlay system. The assessment may be further performed to determine one or more operations that may be executed to meet the unsatisfied requirements. Such operations may be automatic and may be executed by one or more modules of the overlay system 202 based on an internal stimulus generated by the overlay system 202 for the same. Alternatively, such operations may be executed based on an external stimulus inputted via a user device associated with the overlay system 202. The external stimulus may be provided based on a recommendation presented by the overlay system 202 to execute the operations to meet the unsatisfied requirements. The data analysis report may be generated by the data analysis overlay node to include the set of outputs of the set of rules, insights/observations associated with the set of outputs, one or more actions to be taken based on the data analysis of the dataset, or the like.

In some embodiments, the data analysis overlay node may be a stateful data analysis overlay node or a stateless data analysis overlay node. Based on the data analysis overlay node being the stateful data analysis overlay node, the data analysis report generated by the data analysis overlay node may be stored permanently within the overlay system 202. The data analysis report may be stored in association with the dataset being analyzed or along with the data analysis overlay node. Based on the data analysis overlay node being the stateless data analysis overlay node, the data analysis report may be erased/deleted after a predefined time-interval. Hence, the data analysis report may be required to be re-generated based on a requirement thereof.

Although the executable node 402 is shown to include the first and second overlay nodes 406 and 408, in other embodiments, the executable node 402 may include any number of overlay nodes, without deviating from the scope of the present disclosure.

The executable node 402 extends the base node 302 (or is a subtype of the base node 302) such that all the functionality and properties of the base node 302 are accessible to the executable node 402. The executable node 402 also dynamically extends the functionality of the base node 302 by associating the overlay nodes maintained by the overlay manager 404 with the base node 302. The executable node 402 may thus be considered a combination of the base node 302 and the first and second overlay nodes 406 and 408. The executable node 402 may be alternatively referred to as a node with overlay(s). Therefore, the executable node 402 acts as a decorator of the base node 302 adding the functionality of the overlay manager 404 to the base node 302.

It will be apparent to a person skilled in the art that the base node 302 refers to any suitable node within the executable graph-based model 100. As such, the base node 302 may be a node having a node type such as a vertex node type, an edge node type, an overlay node type, a message node type, or the like. Alternatively, the base node 302 may be an executable node such that the functionality of the (executable) base node 302 is dynamically extended. In this way, complex and powerful processing functionality can be dynamically generated by associating and extending overlay nodes.

The overlay manager 404 registers and maintains one or more overlay nodes (such as the first overlay node 406 and the second overlay node 408) associated with the base node 302. The assignment of the first and second overlay nodes 406 and 408 to the base node 302 (via the overlay manager 404) endows the base node 302 with processing logic and executable functionality defined within the first and second overlay nodes 406 and 408.

Extending the functionality of a base node through one or more overlay nodes is at the heart of the overlay system 202. As illustrated in FIG. 2, the data (e.g., a vertex node as represented by the base node 302 in FIG. 4) and the functionality that acts upon that data (e.g., an overlay node) can be separated and independently maintained offline, but at run-time, an association between the data node and the overlay node is determined and an executable node is generated (e.g., the executable node 402 shown in FIG. 4).

It will be apparent to a person skilled in the art that functionalities of the first and second overlay nodes 406 and 408 may be performed by a single overlay node that includes processing logic associated with both of the first and second overlay nodes 406 and 408.

It will be apparent to a person skilled in the art that the list of overlay types is not exhaustive and the number of different overlay types that can be realized is not limited. Because an overlay node is itself a node, all functionality of a node described in relation to the base node 302 is thus applicable to an overlay node. For example, an overlay node includes a unique ID, a name, etc., can have attributes (e.g., an overlay node can have its data defined), supports multiple inheritance, and can be configured via node configurations. Furthermore, because an overlay node is a node, the overlay node can have one or more overlay nodes associated therewith (e.g., the overlay node may be an overlay node with an overlay). Moreover, the processing functionality of an overlay node extends to the node type of the node to which the overlay node is applied.

An overlay node, such as the first overlay node 406 or the second overlay node 408, is not bound to a single executable node or a single executable graph-based model (unlike nodes that have non-overlay node types). This allows overlay nodes to be centrally managed and reused across multiple instances of executable graph-based models. Notably, a node (for example, a base node, an executable node, and an overlay node) may be extended by way of overlays. Further, each overlay node may be extended to have one or more overlays. Such overlays may be termed chaining overlays. Also, a single overlay node may be associated with multiple executable nodes. Thus, the overlay node and functionality thereof may be shared among the multiple executable nodes.

The overlay manager 404 of the executable node 402 is responsible for executing all overlays registered therewith. The overlay manager 404 also coordinates the execution of all associated overlay nodes. As shown in FIG. 4, the executable node 402 associates the base node 302 with two overlay nodes (e.g., the first and second overlay nodes 406 and 408). Thus, the overlay manager 404 employs a strategy to manage the potentially cascading execution flow. Example strategies to manage the cascading execution of overlays include the visitor pattern and the pipe and filter pattern. Further examples include strategies that apply either breadth-first or depth-first processing patterns, a prioritization strategy, or a combination thereof. All execution strategies are defined and registered with the overlay manager 404 and are associated with an overlay via a node configuration extension for the overlay.

The data and the processing logic associated with one or more overlays of an executable node (for example, the executable node 402) are persistent. The persistent nature of the data and the processing logic are described in detail in conjunction with FIG. 5.

Figure 5:
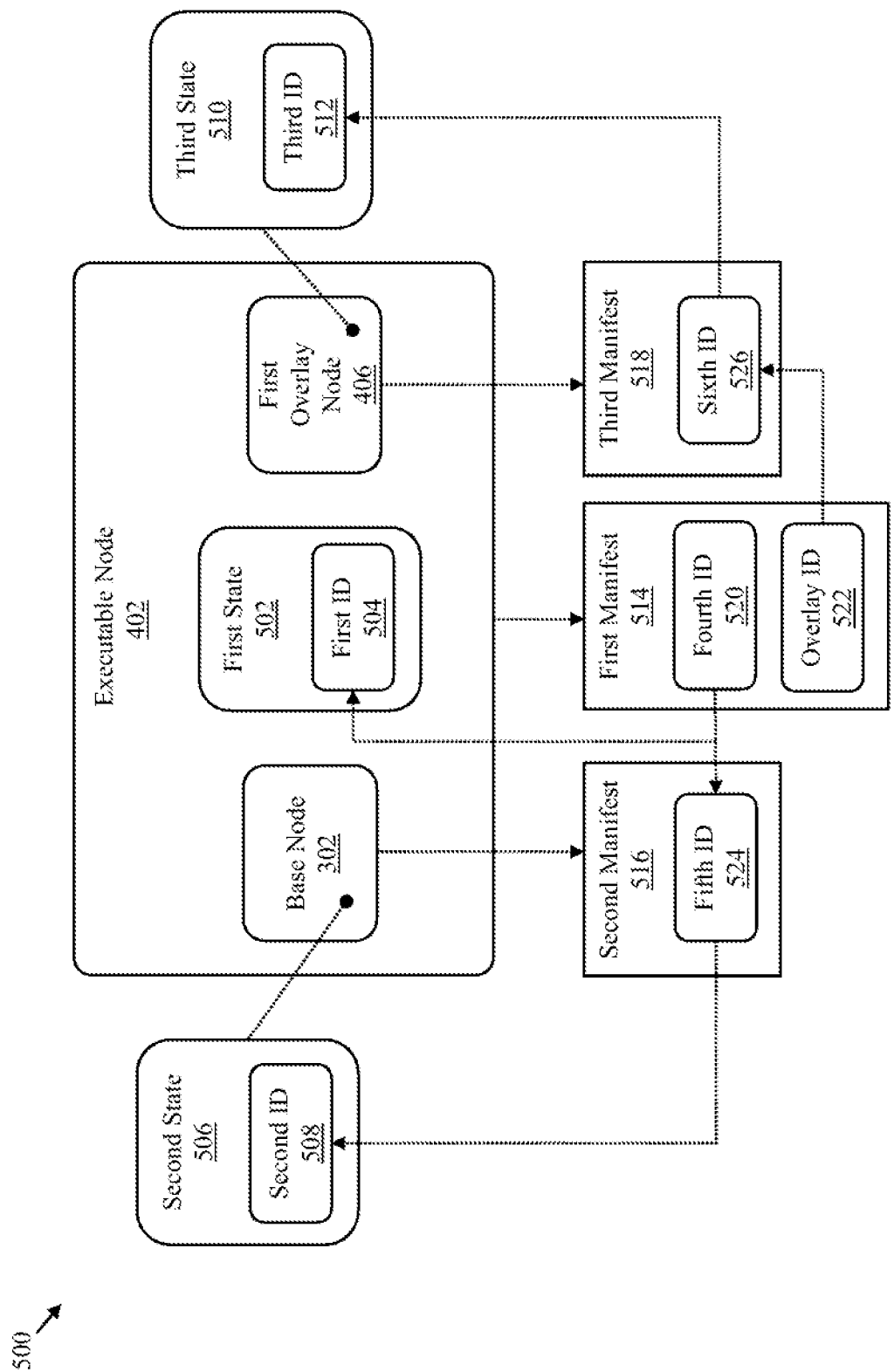
FIG. 5 is a block diagram that illustrates a composition of the executable node that enables persistent storage of data and processing logic associated therewith, in accordance with an embodiment of the present disclosure.

FIG. 5 is a block diagram 500 that illustrates a composition of the executable node 402 that enables persistent storage of data and the processing logic associated therewith, in accordance with an embodiment of the present disclosure.

As described in conjunction with FIG. 4, the executable node 402 includes the base node 302 and one or more overlay nodes (e.g., the first and second overlay nodes 406 and 408). For the brevity of the ongoing description, the persistent storage is explained for the executable node 402 including only the first overlay node 406. One or more operations performed for ensuring the persistence of the first overlay node 406 may be performed for the second overlay node 408 as well.

Referring to FIG. 5, the executable node 402 includes the base node 302 and the first overlay node 406. The executable node 402 has a corresponding first state 502 having a first ID 504. The base node 302 has a second state 506 having a second ID 508, and the first overlay node 406 has a third state 510 having a third ID 512. A manifest (for example, first through third manifests 514-518) is generated for each of the base node 302, the executable node 402, and the first overlay node 406. In an embodiment, the manifests may be generated by the storage management module 220. The first manifest 514 is associated with the executable node 402 and has a fourth ID 520 and an overlay ID 522. The second manifest 516 is associated with the base node 302 and has a fifth ID 524. The third manifest 518 is associated with the first overlay node 406 and has a sixth ID 526. Further, the manifests are stored at respective storage locations that may be centralized or distributed storage locations associated with the overlay system 202. The manifests may be stored by the storage management module 220.

The first state 502 of the executable node 402 includes data required to reconstruct the executable node 402 (e.g., attributes, properties, etc.). The first state 502 of the executable node 402 is persistently stored along with the first ID 504. The first manifest 514 is generated for the executable node 402 and has (i) the fourth ID 520 (which is the same as the first ID 504), (ii) the storage location of the first state 502 of the executable node 402, and (iii) the overlay ID 522 (which is the same as the sixth ID 526). Notably, the fourth ID 520 is the same as the first ID 504 and the fifth ID 524, hence, the first manifest 514 includes the ID of the state of the base node 302 and the executable node 402. Further, the overlay ID 522 is the same as the sixth ID 526 of the state of the first overlay node 406. Therefore, the first manifest 514 may be used to identify and retrieve the states of the base node 302, the executable node 402, and the first overlay node 406. Subsequently, the retrieved states may be used to reconstruct the executable node 402 and the first overlay node 406. In an instance, the executable node 402 may be further extended to include additional overlay nodes. In such an instance, the first manifest 514 may include state IDs of the additional overlay nodes as well. A first manifest state (not shown) is then generated for the first manifest 514 and persistently stored along with the fourth ID 520.

The second state 506 of the base node 302 includes data required to reconstruct the base node 302 (e.g., attributes, properties, etc.) and is persistently stored along with the second ID 508. The second manifest 516 is generated for the base node 302 and has (i) the fifth ID 524 and (ii) the storage location of the second state 506 of the base node 302. The second ID 508 of the second state 506 and the fifth ID 524 of the second manifest 516 are the same as the first ID 504 of the first state 502 of the executable node 402 (which is also the same as the fourth ID 520 of the first manifest 514 of the executable node 402). As mentioned above, along with the first state 502, the first manifest 514 may also be used to identify and retrieve the second manifest 516 which in turn may be used to identify the second state 506 of the base node 302. A second manifest state (not shown) is then generated for the second manifest 516 and persistently stored along with the fifth ID 524. Thus, the states, manifests, and manifest states for the executable node 402 and the base node 302 include the same, shared, ID. A shared ID can be used in this instance because the states, manifests, and manifest states are stored separately. The separate storage of the states, manifests, and manifest states exhibit a distributed architecture of the overlay system 202.

The third state 510 of the first overlay node 406 includes data required to reconstruct the first overlay node 406 (e.g., attributes, properties, processing logic, etc.) and is persistently stored along with the third ID 512. The third manifest 518 is generated for the first overlay node 406 and includes the sixth ID 526, which is the same as the third ID 512. Therefore, the first manifest 514 may be further used to identify and retrieve the third manifest 518 which in turn may be used to identify and retrieve the third state 510 of the first overlay node 406. A third manifest state (not shown) is then generated for the third manifest 518 and is persistently stored along with the sixth ID 526.

In operation, when the executable node 402 is to be loaded, the transaction module 208, in conjunction with the storage management module 220, may execute one or more operations to retrieve the first manifest state stored at a known storage location. Based on the first manifest state, the storage management module 220 may re-construct the first manifest 514 which includes the fourth ID 520 which is the same as the fifth ID 524 of the second manifest 516. Based on the fifth ID 524, the storage management module 220 may identify the second manifest state and may generate the second manifest 516 based on which the second state 506 is identified. Subsequently, the base node 302 is loaded and the storage management module 220 may determine that the base node is a node with overlay. Based on the fourth ID 520 (that is the same as the first ID 504 of the first state 502 of the executable node 402) of the first manifest 514, the first state 502 is identified and retrieved. Subsequently, the executable node 402 is loaded. Moreover, based on the overlay ID 522 (that is the same as the sixth ID 526 of the third manifest 518) of the first manifest 514, the third manifest state is identified and the third manifest 518 is generated. Subsequently, based on the sixth ID 526 (that is the same as the third ID of the third state) of the third manifest 518, the third state 510 is identified and retrieved.

Based on the third state 510, the first overlay node 406 is reconstructed and loaded in the executable graph-based model 100.

In some embodiments, the first overlay node 406 may not be loaded in case it is not required for executing the operation associated with the stimulus 230. The loaded executable node 402 and the first overlay node 406 may be unloaded in case they remain unused for a predefined time period, whereas one or more executable nodes that are used at least once during the predefined time period may remain loaded in the executable graph-based model 100. In some embodiments, the data and processing logic associated with a loaded executable node and/or overlay node may be transferred to a local memory of the overlay system 202 if the data and the processing logic remain unused for a first predefined period of time. Further, the data and the processing logic associated with the executable node/overlay node are transferred to an external storage from the local memory in case the executable node/overlay node remains unused for a second predefined period of time. The second predefined period of time is greater than the first predefined period of time. The term unloading refers to storing a state of a node with a current version of data and processing logic associated therewith at a storage location that is pointed by the corresponding manifest.

An executable graph-based model (for example, the executable graph-based model 100) may be stored (and loaded) using the above-described composition. Beneficially, each component is stored separately thereby allowing a user to maintain and store their data independently of the storage of the structure and functionality of the executable graph-based model 100.

Notably, all manifest states are stored together at a storage location that is known to the storage management module 220. Such centralized storage of the manifest states ensures that node states associated therewith are easily accessible.

It will be apparent to a person skilled in the art that although FIG. 5 illustrates only a single overlay node, in other embodiments, the executable node may include additional or different overlay nodes (for example, the second overlay node 408). It will also be apparent to a person skilled in the art that only those overlay nodes that are required for responding to the stimulus 230 may be loaded.

The overlay system 202 described above may be used to implement systems and methods for facilitating in-situ data analysis in the executable graph-based model 100.

Figure 6:
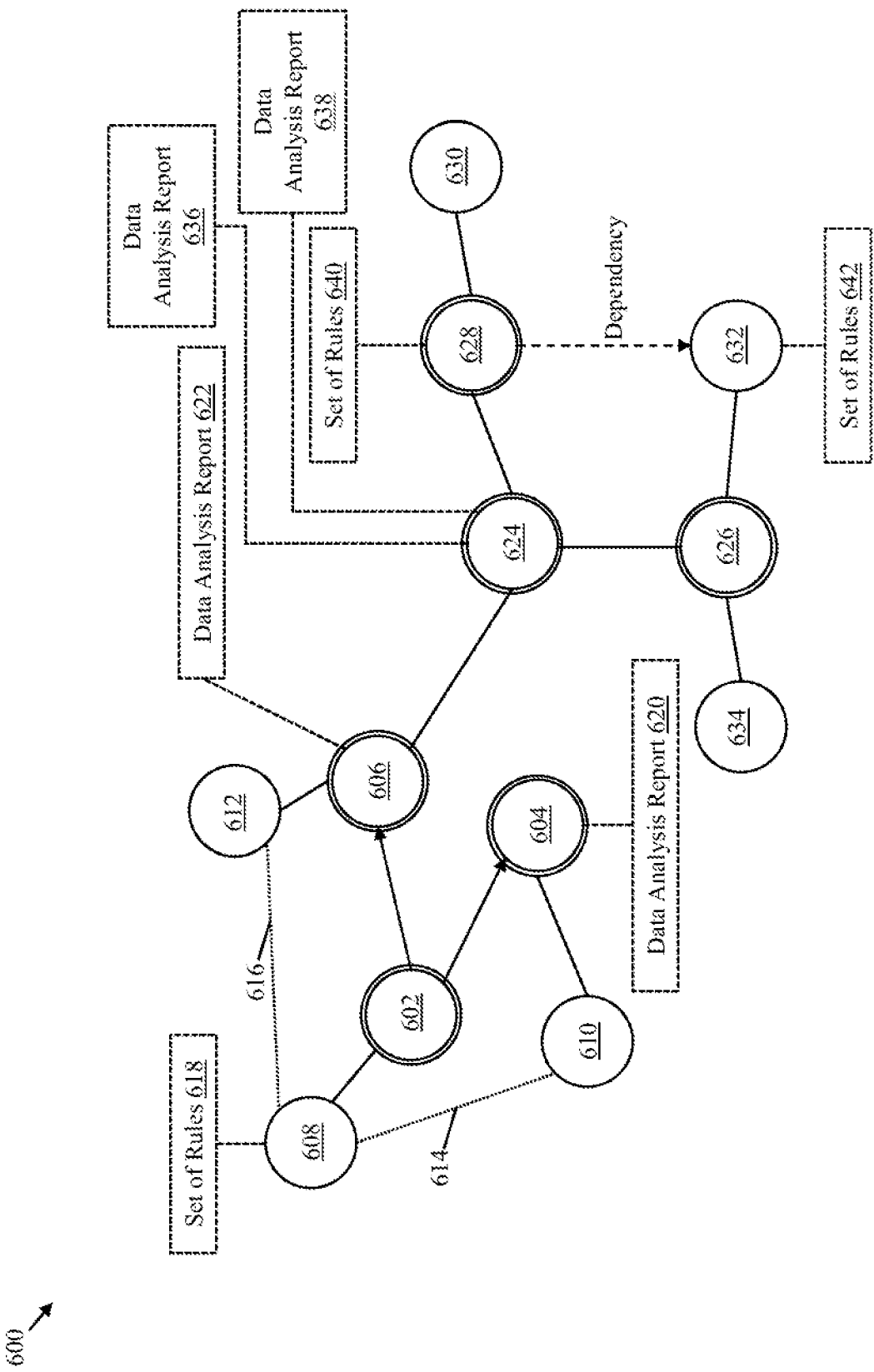
FIG. 6 is a graph that illustrates an implementation of the executable graph-based model, in accordance with an embodiment of the present disclosure.

FIG. 6 is a graph 600 that illustrates an implementation of the executable graph-based model 100, in accordance with an embodiment of the present disclosure. The graph 600 includes a plurality of executable nodes that have to be analyzed to determine whether data stored therein adheres to a set of constraints. Referring to FIG. 6, the graph 600 (e.g., the executable graph-based model 100) includes a node template 602 and node instances 604 and 606 of the node template 602. The node template 602 is associated with a rule overlay node 608 that includes a set of rules 618 that is to be adhered to by data associated with each node instance (for example, the node instances 604 and 606) of the node template 602. Further, the node instances 604 and 606 are shown to be associated with data analysis overlay nodes 610 and 612, respectively. Dotted lines 614 and 616 that couple the rule overlay node 608 with the data analysis overlay nodes 610 and 612, respectively, indicate that the data analysis overlay nodes 610 and 612 are coupled with the rule overlay node 608 in a loosely coupled manner. That is to say that, the data analysis overlay nodes 610 and 612 are coupled with the rule overlay node 608 via the node instances 604 and 606, respectively, and the node template 602.

As mentioned previously, the rule overlay node 608 includes the set of rules 618. Each rule of the set of rules 618 may correspond to a mandatory rule, a string length rule, a regular expression rule, or a combination thereof, for performing data analysis. The mandatory rule is an essential rule that must be adhered to by a dataset being analyzed. The string length rule provides a range that includes an upper limit and a lower limit for one or more data values of one or more data elements of the dataset. The regular expression rule defines one or more data values for one or more data elements of the dataset being analyzed.

It will be apparent to a person skilled in the art that though the set of rules 618 is described to have rules that may be the mandatory rule, the string length rule, the regular expression rule, or the combination thereof, in practical implementations the det of rules 618 may include any other rule for performing data analysis of data associated with the overlay system 202.

In an embodiment, the dataset may pertain to an employee dataset. The node template 602 may define a data structure for storing records of an employee. The node instance 604 may store a data record associated with 'Employee 1' and the node instance 606 may store a data record associated with 'Employee 2'. Each data record may include data elements 'Employee Name', 'Address', and 'Date of Birth'. The data record associated with 'Employee 1' may have a data value 'Mathew Gomez' corresponding to the data element 'Employee Name', another data value '456 Park Avenue, New York' for the data element 'Address', and another data value '26 Sep. 1986' for the data element 'Date of Birth'. The data record associated with 'Employee 2' may not have any data value corresponding to the data element 'Employee Name'. The data record associated with 'Employee 2' may have a data value '3741 Neville Street, Evansville, Indiana' for the data element 'Address', and another data value 'Aug. 17, 1989' for the data element 'Date of Birth'. Data values of the data record associated with 'Employee 1' may be stored as a plurality of attribute values of the plurality of attributes of the node instance 604, whereas data values of the data record associated with 'Employee 2' may be stored as a plurality of attribute values of the plurality of attributes of the node instance 606.

In such an embodiment, the set of rules 618 may include a mandatory rule 'data record must have a data value for the data element 'Employee Name'', a string length rule 'Minimum string length—2 characters, Maximum String length—8 characters' for a data value for the data element 'Date of Birth', and a regular expression rule 'data value for the data element should be in a format 'Date/Month/year''. In operation, the processing circuitry (such as, the controller module 206) may receive a first stimulus (for example, the stimulus 230) that may be indicative of a first data analysis operation to be performed to analyze the employee dataset. The processing circuitry (such as, the context module 210) may be configured to compare/match a context of the first stimulus with the set of defined contexts. Based on a match of the context with the rule execution context, the processing circuitry (such as, the controller module 206, the message management module 214, or the like) may execute the first data analysis operation associated with the first stimulus. For execution of the first data analysis operation, the processing circuitry (such as, the controller module 206, the message management module 214, or the like) may identify, in the executable graph-based model 100, the node instances 604 and 606 that, collectively, store the employee dataset, the rule overlay node 608 that is associated with the node instances 604 and 606 via the node template 602, and the data analysis overlay nodes 610 and 612 associated with the node instances 604 and 606, respectively.

The processing circuitry (such as, the controller module 206, the message management module 214, or the like) may determine whether the node instances 604 and 606, the rule overlay node 608, and the data analysis overlay nodes 610 and 612 are loaded in the executable graph-based model 100. In an instance, when any of the node instances 604 and 606, the rule overlay node 608, and the data analysis overlay nodes 610 and 612 are not loaded, the processing circuitry (such as, the memory management module 218 and the storage management module 220) may load such nodes as described in conjunction with FIG. 5. Subsequently, the processing circuitry (such as, the rule engine module 242) may execute the set of rules 618 on compositions of the node instances 604 and 606. The composition of each of the node instances 604 and 606 corresponds to attribute values of the plurality of attributes thereof. In other words, the composition of each of the node instances 604 and 606 corresponds to data values of data elements associated with the data record stored thereat.

For the execution of the set of rules 618 on the compositions of the node instances 604 and 606, the processing circuitry (such as, the rule engine module 242) may perform a mathematical operation, a statistical operation, a Boolean operation, a decision-making operation, a logical operation, or a combination thereof, on the compositions of the node instances 604 and 606. It will be apparent to a person skilled in the art that the processing circuitry (such as, the rule engine module 242) may further perform any other or additional operation required for the execution of the set of rules 618.

Based on the execution of the set of rules 618 on the compositions of the node instances 604 and 606, the rule overlay node 608 may generate a set of outputs for each of the node instances 604 and 606. The set of outputs includes an output for each rule of the set of rules 618. Each output of the set of outputs may correspond to success, failure, or partial success. With reference to the abovementioned example, a first set of outputs that is generated based on the execution of the set of rules 618 on the node instance 604 may include a first output 'Success' for the mandatory rule, a second output 'Success' for the string length rule, and a third output 'Success' for the regular expression rule. A second set of outputs that is generated based on the execution of the set of rules 618 on the node instance 606 may include a fourth output 'Fail' for the mandatory rule, a fifth output 'Success' for the string length rule, and a sixth output 'Fail' for the regular expression rule. Further, a set of rule thresholds for the set of rules 618 may indicate that a success output for the mandatory rule may be indicative of the set of outputs exceeding the set of rule thresholds.

In other embodiments, each output of the set of outputs may be a percentage. In such embodiments, the set of rule thresholds may be indicative of a threshold percentage for each rule of the set of rules. Alternatively, the set of rule thresholds may be indicative of a single threshold percentage for the set of outputs.

The first and second sets of outputs may be used by the data analysis overlay nodes 610 and 612, respectively. The data analysis overlay node 610 may determine, based on the first set of outputs passing the set of rule thresholds, that a first data analysis score associated with the data record for 'Employee 1' exceeds a data analysis score threshold. A data analysis score may be indicative of quality, usability, or the like, associated with data that is being analyzed. The data analysis score being greater that the data analysis score threshold indicates that the data is usable or acceptable for the one or more system operations being executed by the overlay system 202 that require the dataset for execution thereof.

Subsequently, the data analysis overlay nodes 610 and 612 may generate data analysis reports 620 and 622, respectively. The data analysis reports 620 and 622 may include the first and second set of outputs, respectively, and one or more insights associated with the corresponding set of outputs. In an embodiment, when the first data analysis operation is performed to analyze the quality of the employee dataset, the data analysis reports 620 and 622 may be a data quality report. The set of outputs and the one or more insights/observations associated therewith may be indicative of the quality of the employee dataset.

With reference to the abovementioned example, the one or more insights may correspond to data quality of the data record associated with 'Employee 1' being satisfactory and data quality of the data record 'Employee 2' being unsatisfactory. Similarly, in another embodiment, when the first data analysis operation is performed to profile the employee dataset, the data analysis reports 620 and 622 may be a data profile. The set of outputs and the one or more insights associated therewith may be indicative of one or more groups, domains, or the like, with which the employee dataset may be associated. Similarly, when the first data analysis operation is performed to assess the employee dataset, the data records stored at the node instances 604 and 606 are accessed based on corresponding data analysis score. Hence, the data analysis reports 620 and 622 may be a data assessment report. The first and second set of outputs and the one or more insights associated therewith may be indicative of one or more observations that are determined based on the assessment of the employee dataset. In other embodiments, the first data analysis operation may be executed for analysis of data to perform one or more user-defined analysis. In such embodiments, the data analysis reports may include one or more analysis outcomes in response to the user-defined analysis.

In some embodiments, the set of rules 618 is associated with a rule context that is indicative of a definition of the set of rules 618. The definition of the set of rules 618 refers to a description of an intent, an objective, a purpose, an expected set of outputs, or the like associated therewith. With reference to the abovementioned example, the definition of the set of rules 618 may include an objective associated therewith, where the objective may be 'verification of data records in the employee dataset such that each data record has data values for essential data elements and each data value in the employee dataset adheres to constraints applied by an administrator of the employee dataset'. The rule context associated with the set of rules 618 may be further associated with the data analysis reports 620 and 622. Such association of the rule context with the data analysis reports 620 and 622 provides for a holistic and complete understanding of the data analysis reports 620 and 622. In other words, the data analysis reports 620 and 622 in association with the rule context provides for (i) an understanding of the dataset being analyzed, (ii) a result of the first data analysis operation, and (iii) an expectation from the dataset regarding the structure in which it is expected to be stored in the overlay system 202.

The processing circuitry (such as, the controller module 206, the data analysis module 244, or the like) may be further configured to tag the node instances 604 and the 606 with the data analysis reports 620 and 622, respectively. Such tagged data analysis reports 620 and 622 may be used in scenarios when the node instances 604 and 606, respectively, are to be used for execution of one or more operations associated with the overlay system 202.

The executable graph-based model 100 may further include an executable node 624 that is associated with the node instance 606 and another executable node 626. As shown, the executable node 624 is associated with a rule overlay node 628 that is associated with a data analysis overlay node 630. Here, a direct association between the rule overlay node 628 and the data analysis overlay node 630 corresponds to a tight coupling thereof. Further, the executable node 626 is associated with a rule overlay node 632 and a data analysis overlay node 634. As shown, the association with the executable node 626 is common for the rule overlay node 632 and the data analysis overlay node 634. Therefore, the data analysis overlay node 634 may access the rule overlay node 632 via the executable node 626. Hence, the rule overlay node 632 and the data analysis overlay node 634 are loosely coupled.

In an embodiment, a second stimulus (such as the stimulus 230) may be received by the overlay system 202. The second stimulus may be indicative of a second data analysis operation to be executed to analyze the executable node 624. The second data analysis operation may be executed in a manner that is similar to the execution of the first data analysis operation. Based on the execution of the second data analysis operation, the executable node 624 may be tagged with a data analysis report 636. Subsequently, a third stimulus (for example, the stimulus 230) may be received by the overlay system 202. The third stimulus may be indicative of a third data analysis operation to be executed to analyze the executable node 624. The third data analysis operation may be executed in a manner that is similar to the execution of the first data analysis operation. Based on the execution of the third data analysis operation, the executable node 624 may be further tagged with another data analysis report 638. Notably, the data analysis report 636 is generated based on analysis of the executable node 624 at a first time-instance associated with reception of the second stimulus, whereas, the data analysis report 638 is generated based on analysis of the executable node 624 at a second time-instance associated with reception of the third stimulus, where the second time-instance occurs after the first time-instance. Therefore, the data analysis report 636 is indicative of an evaluation of the executable node 624 at the first time-instance, whereas, the data analysis report 638 is indicative of an evaluation of the executable node 624 at the second time-instance. Subsequently, the processing circuitry (such as, the controller module 206, the data analysis module 244, or the like) may compare the data analysis reports 636 and 638 to determine a pattern of change in data associated with the executable node 624. In an instance, the data analysis report 638 may indicate an improved evaluation of the executable node 624 as compared to evaluation thereof indicated by the data analysis report 636. In such an instance, the processing circuitry (such as, the controller module 206, the data analysis module 244, or the like) may determine that a performance (in terms of quality, rule adherence, completeness, conformity, uniqueness, or the like) of the data associated with the executable node 624 is exhibiting a pattern of improvement. In another instance, the data analysis report 638 may indicate a degraded evaluation of the executable node 624 as compared to evaluation thereof indicated by the data analysis report 636. In such an instance, the processing circuitry (such as, the controller module 206, the data analysis module 244, or the like) may determine that a performance (in terms of quality, rule adherence, or the like) of the data associated with the executable node 624 is exhibiting a pattern of deterioration.

In some embodiments, a data analysis score determined for the executable node 624 at the first time-instance may be compared with the data analysis score determined for the executable node 624 at the second time-instance. In an instance, when the data analysis score determined at the first time-instance is less than the data analysis score determined at the second time-instance, the processing circuitry (such as, the data analysis module 244) determines that the performance (in terms of quality, rule adherence, or the like) of the data associated with the executable node 624 is exhibiting the pattern of improvement. In another instance, when the data analysis score determined at the second time-instance is less than the data analysis score determined at the first time-instance, the processing circuitry (such as, the data analysis module 244) determines that the performance (in terms of quality, rule adherence, or the like) of the data associated with the executable node 624 is exhibiting the pattern of deterioration.

In some embodiments, the data analysis score determined at the first time-instance may be greater than the data analysis score determined at the second time-instance. Additionally, a difference between the data analysis score determined at the first time-instance and the data analysis score determined at the second time-instance may be greater than a first threshold difference. In such embodiments, the processing circuitry (such as, the data analysis module 244) determines that the performance (in terms of quality, rule adherence, or the like) of the data associated with the executable node 624 is exhibiting the pattern of deterioration.

In some embodiments, the data analysis score determined at the second time-instance may be greater than the data analysis score determined at the first time-instance. Additionally, a difference between the data analysis score determined at the first time-instance and the data analysis score determined at the second time-instance may be greater than a second threshold difference. In such embodiments, the processing circuitry (such as, the data analysis module 244) determines that the performance (in terms of quality, rule adherence, or the like) of the data associated with the executable node 624 is exhibiting the pattern of improvement.

Further, the overlay system 202 may receive a fourth stimulus indicative of a fourth data analysis operation to be executed on the executable node 626. The fourth data analysis operation may be executed in a manner that is similar to the execution of the first data analysis operation. Additionally, the rule overlay node 632 of the executable node 626 is dependent on the rule overlay node 628. The dependency of the rule overlay node 632 on the rule overlay node 628 may indicate that the rule overlay node 632 inherits a set of rules 640 of the rule overlay node 628. Alternatively, the dependency of the rule overlay node 632 on the rule overlay node 628 may indicate that the rule overlay node 632, for execution of a set of rules 642 associated therewith, uses a set of outputs that is generated based on an execution of the set of rules 640. Therefore, based on loading of the rule overlay node 632 for execution of the fourth stimulus, the rule overlay node 628 also gets loaded with data and processing logic. It will be apparent to a person skilled in the art that loading of a node refers to loading data and processing logic associated with the node. Hence, the execution of the fourth data analysis operation further includes use of the set of rules 640 and/or the set of outputs associated therewith.

Similarly, the data analysis overlay node 634 may be dependent on the rule overlay node 628 and/or the data analysis overlay node 630. Therefore, the rule overlay node 628 and/or the data analysis overlay node 630 may be loaded based on the loading of the rule overlay node 632.

It will be apparent to a person skilled in the art that the data analysis may be performed on data being inputted to the overlay system 202, data being generated by the overlay system 202, the outcome 234 associated with the overlay system 202, or the like.

It will be apparent to a person skilled in the art that analyzing an executable node refers to analysis of data associated therewith.

Throughout the description, each node that is represented in a corresponding figure as an inner circle enclosed within an outer circle is an executable node. The inner circle represents its base node and the outer circle represents an overlay node associated therewith. Further, coupling of a first node with the inner circle represents an association between the executable node and the first node. A coupling between the outer circle and a second node indicates that the second node is an overlay of the executable node.

FIG. 6 describes data analysis operations being performed in the executable graph-based model 100 in detail. Such data analysis operations are performed based on evaluations that are performed based on relevant sets of rules. As mentioned previously, each rule may correspond to the mandatory rule, the string length rule, the regular expression rule, a combination of these, or any other rule for performing data analysis. Structure of a rule is described in detail in conjunction with FIG. 7.

Figure 7:
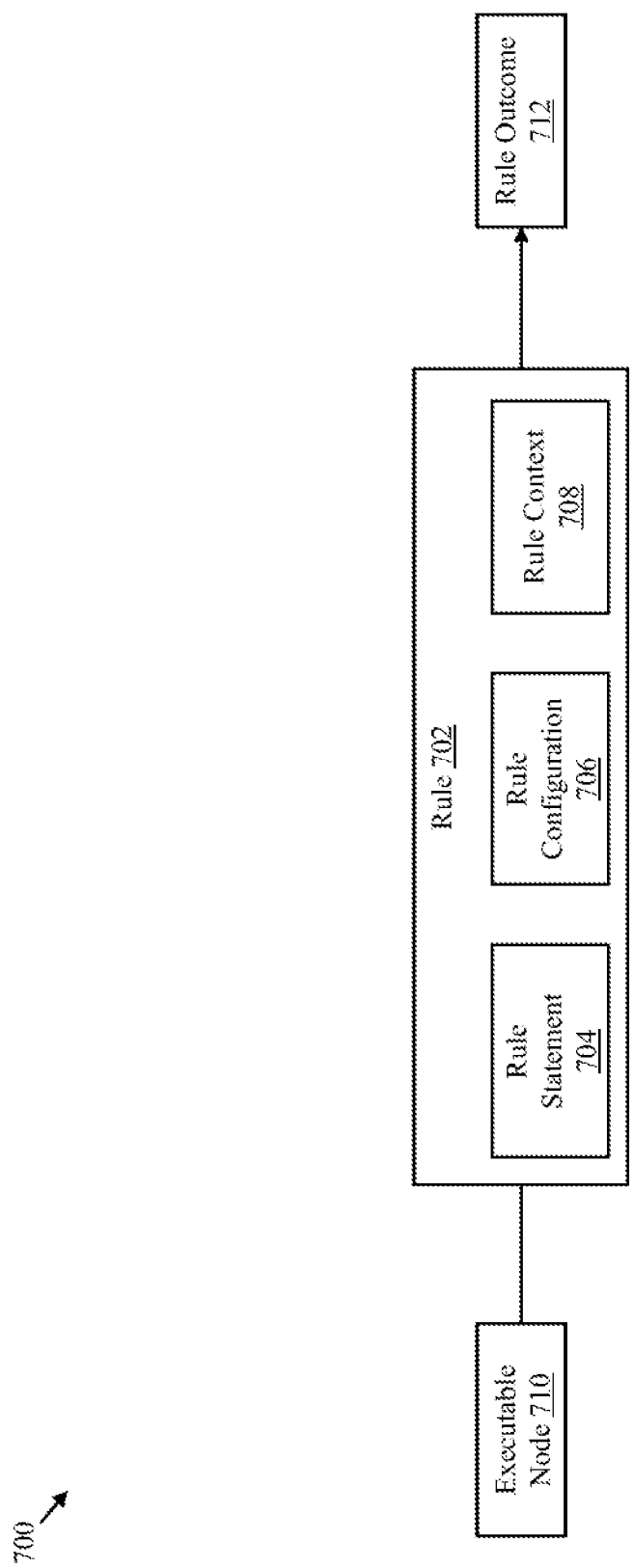
FIG. 7 is a block diagram that illustrates a structure of a rule associated with a rule overlay node, in accordance with an embodiment of the present disclosure.

FIG. 7 is a block diagram 700 that illustrates a structure of a rule associated with a rule overlay node, in accordance with an embodiment of the present disclosure. Referring to FIG. 7, a rule 702 is illustrated, where the rule 702 includes a rule statement 704, a rule configuration 706, and a rule context 708. As shown, the rule 702 is to be executed on data associated with an executable node 710. For the execution of the rule 702, one or more operations defined by way of the rule statement 704 are executed on the executable node 710 to determine whether the executable node 710 adheres to one or more constraints defined by way of the rule configuration 706. The rule statement 704 may be a combination of two or more sub-statements, where each sub-statement defines at least one corresponding operation. Further, the two or more sub-statements may be combined using 'AND' and/or 'OR' operators. In an instance, when the two or more statements are combined using the 'AND' operator, the operation associated with each statement is to be executed on the executable node 710. In another instance, when the two or more statements are combined using the 'OR' operator, the operation associated with one of the two or more statements is to be executed on the executable node 710. The rule statement 704 may be a mandatory rule statement, a string length rule statement, or a regular expression rule statement. The rule configuration 706 may be a string length rule configuration, a regular expression rule configuration, or a combination thereof.

The rule context 708 is indicative of a definition of the rule 702. The definition of the rule 702 refers to a description of an intent, an objective, a purpose, an expected set of outputs, or the like, associated therewith. The rule 702 may have zero or more rule contexts (for example, the rule context 708) associated therewith. In an example, the rule 702 may have a first context 'data analysis for checking data quality' and a second context 'data analysis for performing data assessment to determine uniqueness of data'.

The rule configuration 706 may be indicative of one or more conditions or one or more constraints to be adhered to while executing the one or more operations associated with the rule statement 704. Further, the rule configuration 706 may be indicative of one or more attributes of the plurality of attributes of the executable node 710 on which the one or more operations associated with the rule statement 704 are to be executed, respectively.

In an instance, the rule 702 may be the mandatory rule. In such an instance, the rule 702 may include the mandatory rule statement. The mandatory rule statement defines one or more operations that are to be executed to determine presence of an essential attribute value of the executable node 710. In such an instance, the rule 702 may not include a rule configuration. In an example, the rule 702, being the mandatory rule, may have the rule statement 704 that indicates presence of an attribute value for an attribute 'node identifier' being essential. Therefore, the one or more operations associated with rule statement 704 may determine whether the executable node 710 includes the attribute value.

In another instance, the rule 702 may be the string length rule. In such an instance, the rule 702 may include the string length rule statement. The string length rule statement defines one or more operations that are to be executed to determine whether an attribute value of an attribute on which the rule 702 is to be executed has a string length indicated by the rule configuration 706 of the rule 702. In such an instance, the rule configuration 706 may indicate a range including a minimum string length and a maximum string length to be exhibited by the attribute value. In an example, the rule 702, being the string length rule, may have the rule statement 704 that indicates an attribute value for an attribute 'node identifier' to have a string length within a range. The rule configuration 706 is indicative of a minimum string length and a maximum string length to be exhibited by the attribute value for the attribute 'node identifier'.

In another instance, the rule 702 may be the regular expression rule. In such an instance, the rule 702 may include the regular expression rule statement. The regular expression rule statement defines one or more operations that are to be executed to determine whether an attribute value of an attribute, on which the rule 702 is to be executed, exhibits a data structure, format, or the like, defined by way of the rule configuration 706. In such an instance, the rule configuration 706 may include a list of data structures, formats, or the like, that must be adhered to by the attribute value of the attribute on which the rule 702 is to be executed. In an example, the rule 702, being the regular expression rule, may have the rule statement 704 that indicates one or more operations to be executed to determine whether an attribute value of an attribute 'node identifier' of the executable node 710, on which the rule 702 is being executed, adheres to a data structure, a format, or the like, defined by the rule configuration 706. The rule configuration 706 is indicative of one or more formats to be adhered to by the attribute value for the attribute 'node identifier'.

As shown, the rule 702 includes the rule statement 704. Similarly, a set of rules, that includes the rule 702, includes a set of rule statements. The set of rule statement defines a set of data analysis parameters associated with the set of rules. For example, the rule 702 may be the mandatory rule and a data analysis parameter may be completeness parameter. Therefore, the set of data analysis parameters may include data analysis parameter associated with each rule of the set of rules.

Subsequently, based on the execution of the rule 702 on the executable node 710, a rule outcome 712 may be generated.

It will be apparent to a person skilled in the art that the rule 702 is a part of a set of rules of a rule overlay node of the executable node 710. The set of rules may be executed on a dataset to analyze the dataset and determine whether the dataset is usable for one or more system operations being executed by the overlay system 202. The dataset must adhere to the set of rules for the dataset to be usable. The set of rules may be exclusive to a single system operation. Alternatively, the set of rules may be shared among two or more system operations.

It is mentioned throughout the description that for analyzing an executable node, a set of rules is executed on a plurality of attribute values of a plurality of attributes of the executable node. However, in other embodiments, the set of rules may be executed on one or more other components of the executable node. For example, a set of rules may be executed on a label of the executable node to determine whether the label adheres to a specific format. Similarly, same or different set of rules may be executed on other components (for example, namespace, name, version, identifier, or the like) of the executable node.

It will be apparent to a person skilled in the art that a number of rules in a set of rules is non-exhaustive and does not limit the scope of the disclosure. Additionally, a number of set of rules in the overlay system 202 is also non-exhaustive and does not limit the scope of the disclosure. Further, although FIG. 7 illustrates the structure, features, and functionality of a single rule, each rule of each set of rules exhibits a similar structure, features, and functionality.

Having described structure of a rule, the description moves towards various approaches in which the rule may be executed on the composition of a corresponding executable node.

Figure 8A:
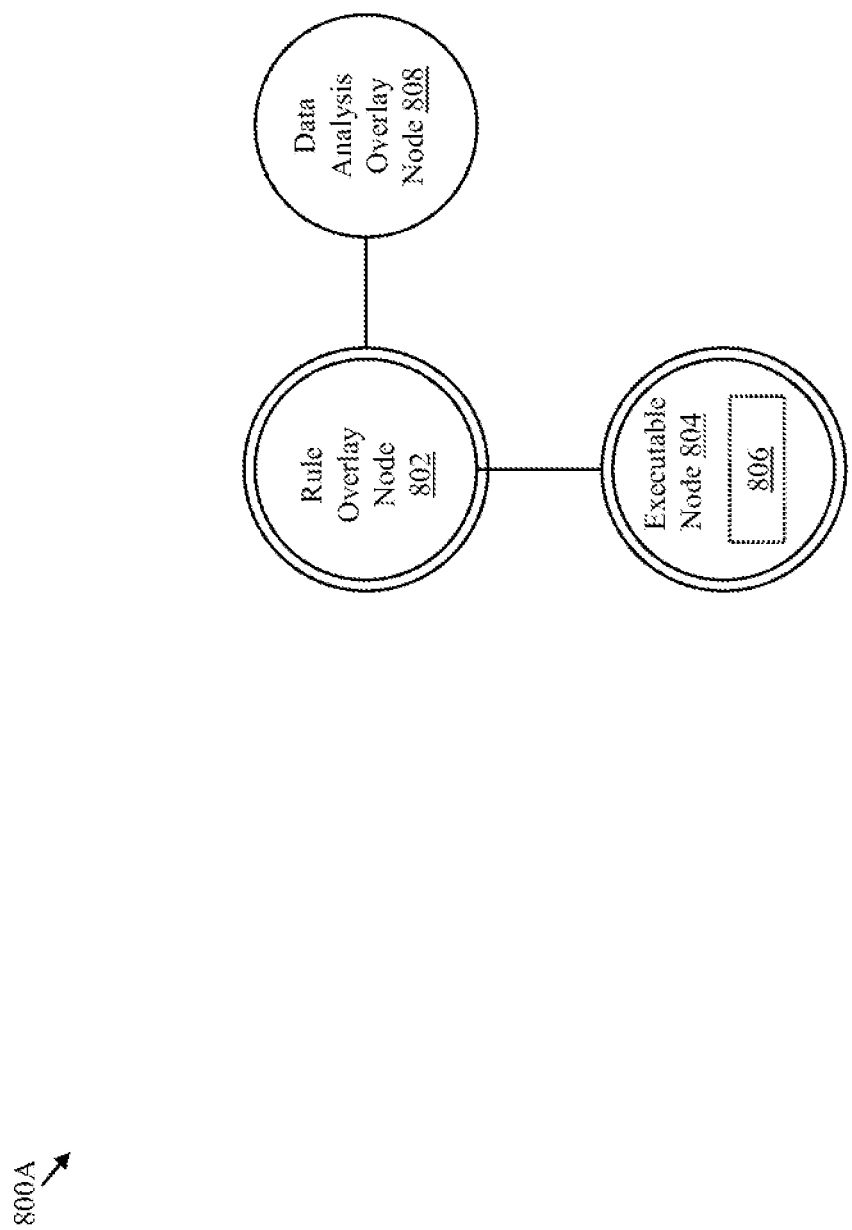
FIGS. 8A-8C are graphs that, collectively, illustrate a plurality of approaches for execution of rules on executable nodes, in accordance with an embodiment of the present disclosure.
Figure 8B:
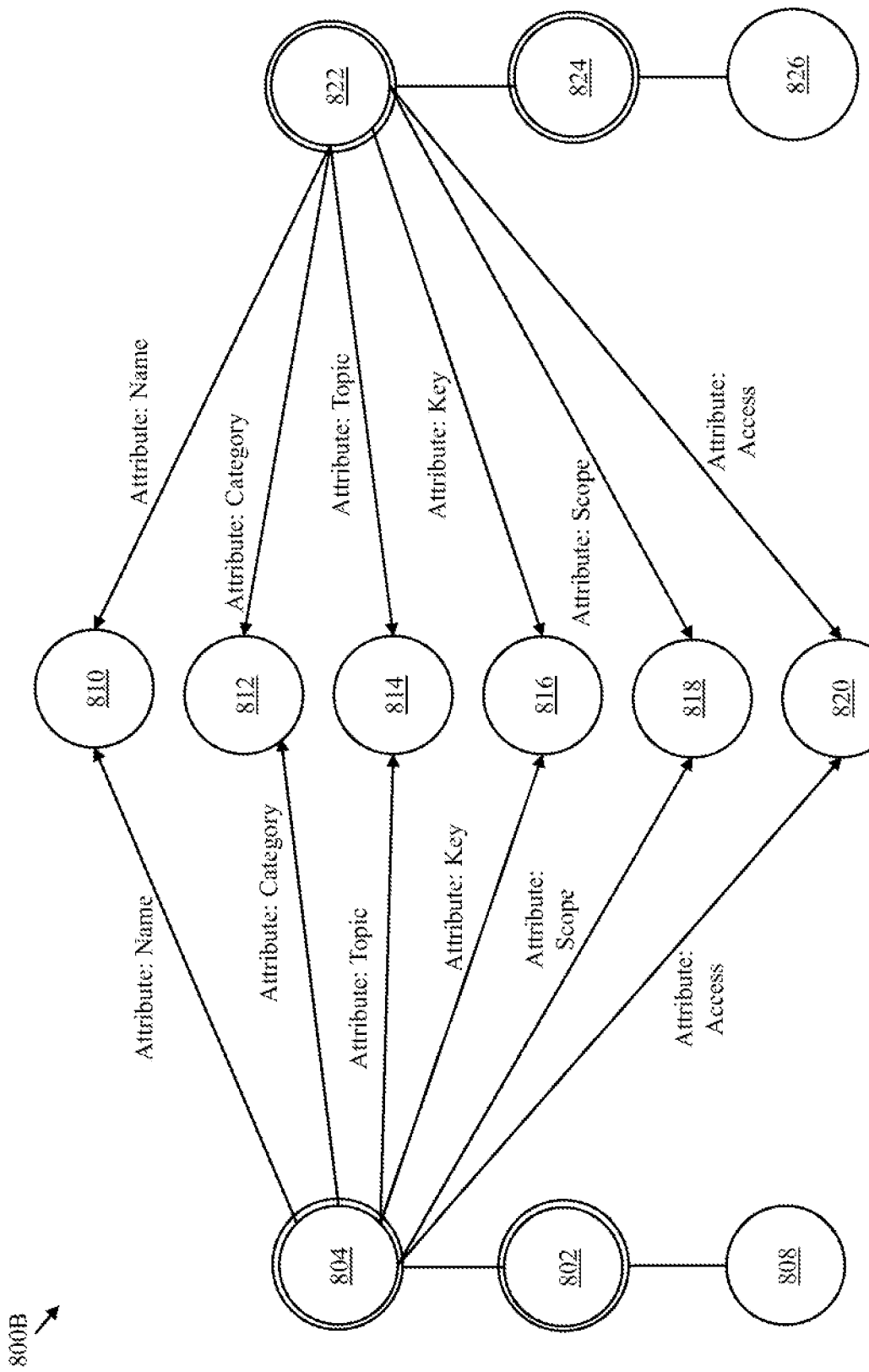
Figure 8C:
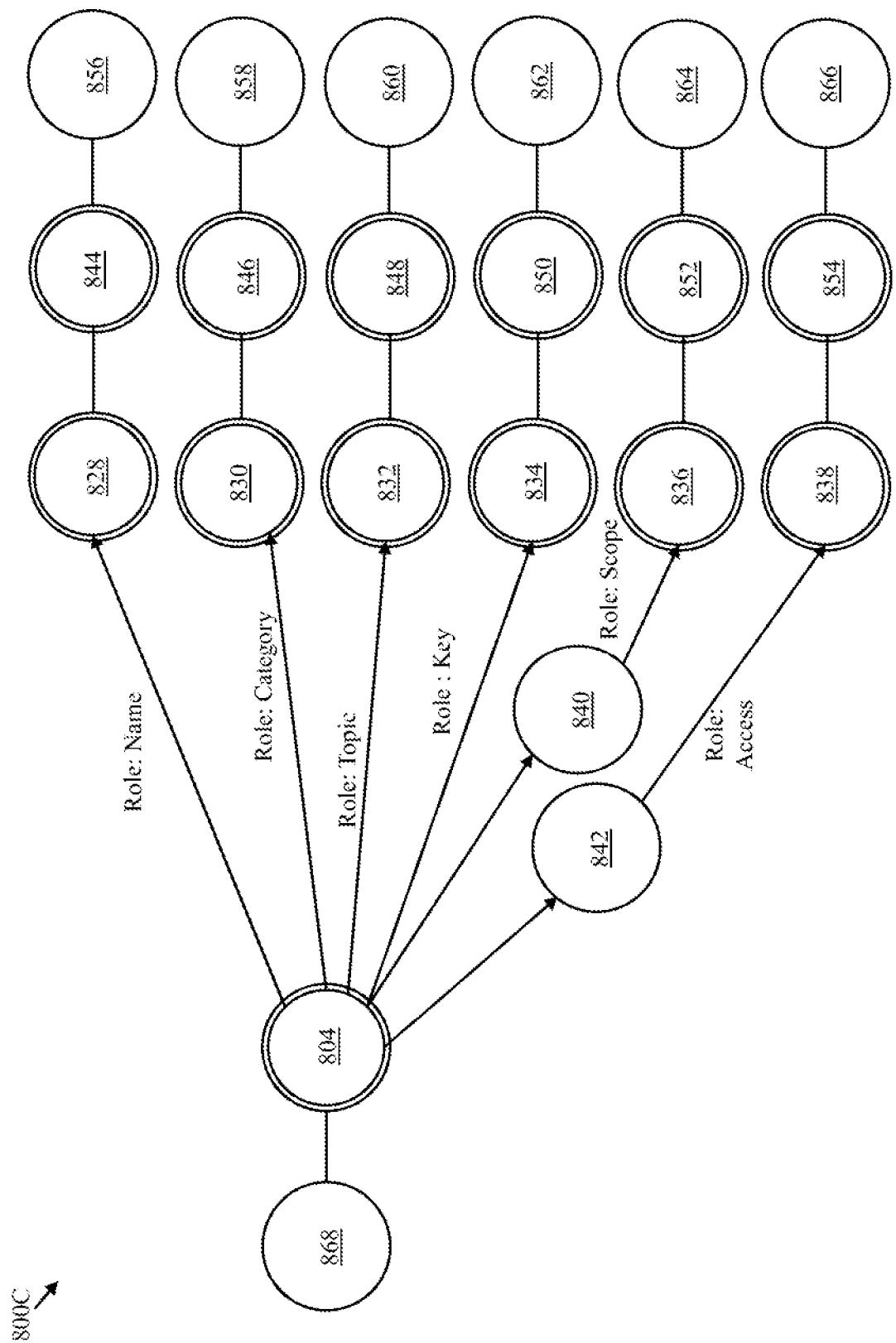

FIGS. 8A-8C are graphs 800A-800C that, collectively, illustrate a plurality of approaches for execution of rules on executable nodes, in accordance with an embodiment of the present disclosure. As mentioned previously, each rule of a set of rules included in a rule overlay node (for example, a rule overlay node 802 shown in FIG. 8A) is executed on a composition of an executable node (for example, an executable node 804 shown in FIG. 8A) associated with the rule overlay node.

The composition of the executable node 804 may be stored within a logical structure of the executable node 804, a plurality of attribute value objects associated with the executable node 804, and/or a plurality of attribute vertex nodes associated with the executable node 804. The executable node 804 is coupled to each of the plurality of attribute vertex nodes via a corresponding attribute edge node. For the sake of ongoing description, the executable node 804 is considered to be a message node (that is an executable node with the message node type).

Referring to FIG. 8A, illustrated is a graph 800A that presents an exemplary scenario when the composition of the executable node 804 is stored within the logical structure of the executable node 804. The logical structure of the executable node 804 refers to one or more elements within the executable graph-based model 100 that are considered to form the executable node 804. The elements may store attribute values (for example, attribute values 806) of a plurality of attributes associated with the executable node

804. The attribute values 806, collectively, form data associated with the executable node 804 that is required to be analyzed.

The executable node 804 may be further associated with the rule overlay node 802 which is associated with a data analysis overlay node 808. Each rule of the set of rules may have a rule configuration that indicates that the rule is to be executed on each attribute value of the attributes of the executable node 804. The rules associated with the rule overlay node 802 is executed on each attribute value of the attribute values 806 stored within the logical structure of the executable node 804. Based on the execution of rules associated with the rule overlay node 802, a set of outputs is generated. The data analysis overlay node 808 is further configured to determine, based on the outputs, whether a data analysis score associated with the executable node 804 exceeds the data analysis score threshold.

The example scenario illustrated in FIG. 8A pertains to a scenario when the attribute values are non-shared and exclusive to the executable node 804.

Referring now to FIG. 8B, illustrated is a graph 800B that illustrates a scenario when the attribute values 806 associated with the executable node 804 are stored, collectively, at a plurality of attribute value objects 810-820. For example, attribute values for attributes 'Name', 'Category', 'Topic', 'Key', 'Scope', and 'Access' are stored at the attribute value objects 810, 812, 814, 816, 818, and 820, respectively. In other embodiments, the executable node 804 may have additional or different attributes associated therewith.

An attribute value object refers to an element of the executable graph-based model 100 that acts as a storage for an attribute value. The attribute value object may be associated with one or more executable nodes that are associated with the attribute value stored thereat. The attribute value object is a mere storage and does not have the structure and features of a base node or an executable node. Further, the attribute values stored at the attribute value objects 810-820 may be shared and common with one or more remaining nodes (for example, an executable node 822) of the executable graph-based model 100. Therefore, the attribute value objects 810-820 are further associated with the executable node 822.

In the scenario depicted in FIG. 8B, the rules associated with the rule overlay node 802 may be executed on the attribute values stored at the attribute value objects 810-820. Based on the execution of the rules, a set of outputs may be generated and used by the data analysis overlay node 808 to determine whether the data analysis score associated with the executable node 804 exceeds the data analysis score threshold. Further, another set of rules associated with a rule overlay node 824 of the executable node 822 may be executed on the attribute value objects 810-820.

The rules associated with the rule overlay node 824 may be same or different from the rules associated with the rule overlay node 802. Based on execution of the rules associated with the rule overlay node 824, a corresponding set of outputs may be generated and used by a data analysis overlay node 826 associated with the rule overlay node 824 to determine whether a data analysis score associated with the executable node 822 exceeds the data analysis score threshold.

Notably, in the scenario illustrated in FIG. 8B, the set of rules associated with the rule overlay node 802 is executed on each attribute value stored at the attribute value objects 810-820. However, such an approach does not allow each attribute value to be analyzed separately based on different data analysis parameters. Further, such an approach does not allow two or more attribute values to share rules. Therefore, in an instance, when a different set of rules is to be applied on one or more attribute values, attribute value objects associated with such attribute values may be transitioned to be attribute vertex nodes that has the structure and features of a base node and/or an executable node. Therefore, each attribute value object that has been transitioned to be the attribute vertex node may be associated with a corresponding rule overlay node and a corresponding data analysis overlay node.

Referring to FIG. 8C, illustrated is a graph 800C that presents a scenario when the attribute values 806 are collectively stored at a plurality of attribute vertex nodes and each attribute vertex node is associated with a corresponding rule overlay node and a corresponding data analysis overlay node. Attribute value stored at each attribute vertex node is evaluated based on execution of a set of rules associated with the corresponding rule overlay node. Further, a set of outputs generated by each rule overlay node may be used by the data analysis overlay node associated with corresponding attribute vertex node to determine whether a data analysis score associated with the attribute value stored with it exceeds the data analysis score threshold.

As shown, the attribute values associated with the executable node 804 are stored at a plurality attribute vertex nodes 828-838. The executable node 804 may be associated with each of the attribute vertex nodes 828-838 by way of a corresponding attribute edge node. For the sake of simplicity, only attribute edge nodes 840 and 842 coupling the executable node 804 and the attribute vertex nodes 836 and 838, respectively, are shown. The attribute edge nodes 840 and 842 include a role for the attribute vertex nodes 836 and 838, respectively. Each of the attribute edge nodes 840 also includes a role for the executable node 804. Similarly, the executable node 804 may be associated with remaining attribute vertex nodes (for example, attribute vertex nodes 828-834) via corresponding attribute edge nodes (not shown). As shown, each of the attribute vertex nodes 828-838 is associated with a role 'Name', 'Category', 'Topic', 'Key', 'Scope', and 'Access', respectively, with which it is associated with the executable node 804.

In some embodiments, one or more attribute vertex nodes of the attribute vertex nodes 828-838 may include data (for example, pointers, links, paths, or the like) that indicates that the corresponding attribute value forms a part of the composition of the executable node 804. In such embodiments, the attribute vertex nodes may have a direct association with the executable node 804 i.e., without an intermediated edge node.

Further, each of the attribute vertex nodes 828-838 may be associated with rule overlay nodes 844-854, respectively. Each of the rule overlay nodes 844-854 may execute corresponding set of rules on the attribute values stored at the attribute vertex nodes 828-838, respectively. Based on execution of the set of rules, each of the rule overlay nodes 844-854 may generate a corresponding set of outputs. As shown, the rule overlay nodes 844-854 are associated with data analysis overlay nodes 856-866, respectively. The data analysis overlay nodes 856-866 may use the set of outputs generated by the rule overlay nodes 844-854, respectively, to determine whether the set of outputs associated with the attribute value stored at the corresponding attribute vertex node exceeds a corresponding rule threshold.

As shown, the executable node 804 is associated with a data analysis overlay node 868 that may communicate with each of the rule overlay nodes 844-854 and use the set of outputs generated thereby to determine whether a data analysis score associated with the executable node 804 exceeds the data analysis score threshold.

Notably, the scenario illustrated in FIG. 8C allows each attribute value to be evaluated based on a set of rules associated with corresponding rule overlay node. The rules executed on each attribute value is specific thereto and may be different from a set of rules included in the rule overlay nodes associated with other attribute vertex nodes of the plurality of attribute vertex nodes 828-838. Also, the transition to/from an attribute value object from/to an attribute vertex node is performed by the processing circuitry (such as, the controller module 206) based on a user input received via a user device associated with the overlay system 202. Such transition to/from an attribute value object from/to an attribute vertex node may be dynamic and hence may be performed as and when analysis of the executable node 804 is to be performed.

Although FIG. 8C illustrates that each attribute vertex node is associated with a corresponding rule overlay node, the scope of the description is not limited to it. In other embodiments, two or more attribute vertex nodes may be associated with a single rule overlay node. In such embodiments, a set of rules of the rule overlay node may be executed on attribute values stored at each of the two or more attribute vertex nodes. FIG. 8C further shows the attribute vertex nodes 828-838 to be associated only with the executable node 804, in other embodiments, the attribute vertex nodes 828-838 may be further associated with one or more other nodes (for example, the executable node 822, or any other node if the executable graph-based model 100).

It will be apparent to a person skilled in the art that the composition of a node (for example, an executable node, a base node, a message node, or the like) may be stored by way of any one of the approaches shown in FIGS. 8A, 8B, and 8C, or a combination of these approaches. The composition of the node may include a plurality of attribute values for a plurality of attributes associated with the node.

Figure 9:
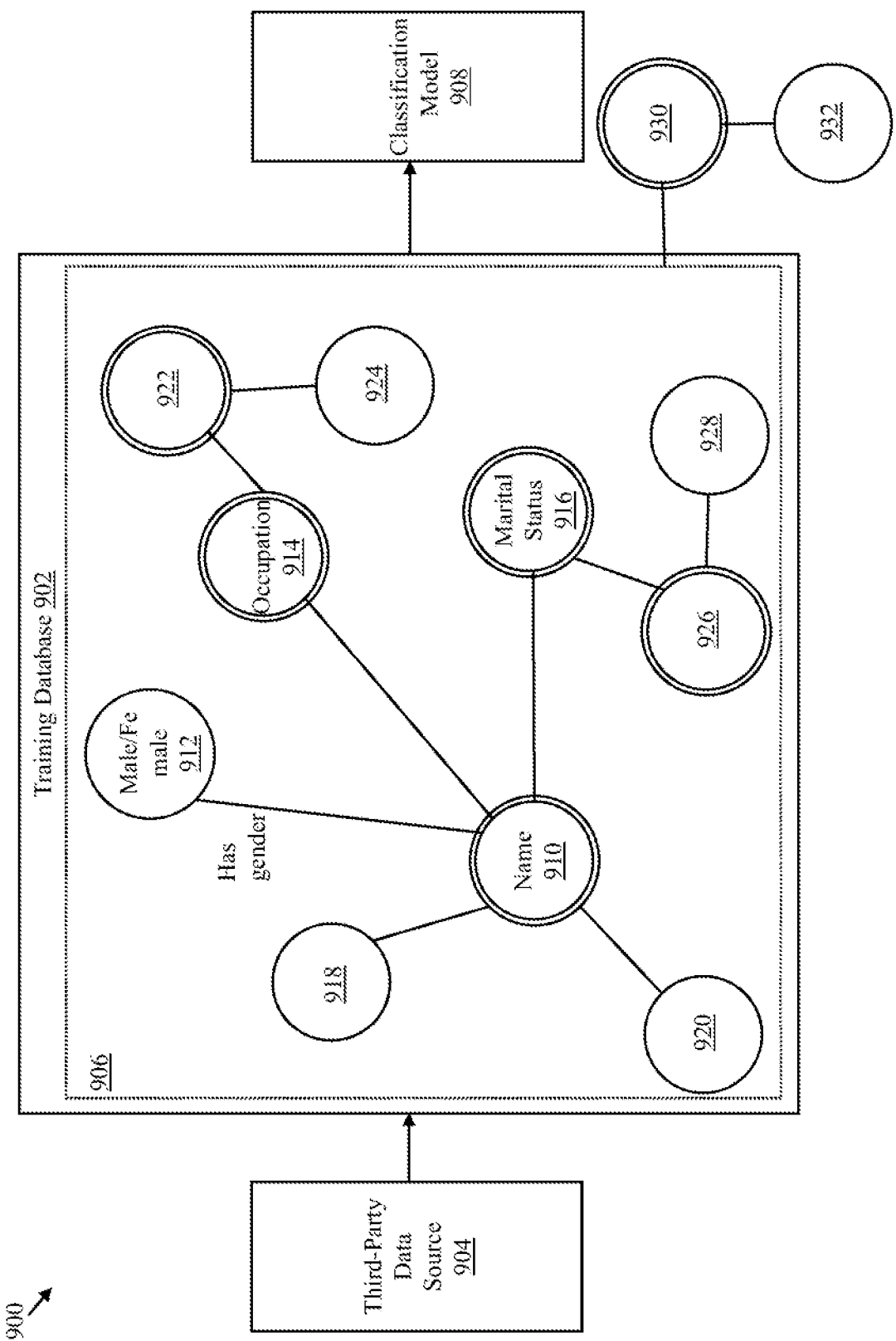
FIG. 9 is a schematic diagram that illustrates an exemplary implementation of the overlay system, in accordance with an embodiment of the present disclosure.

FIG. 9 is a schematic diagram 900 that illustrates an exemplary implementation of the overlay system 202, in accordance with an embodiment of the present disclosure. Referring to FIG. 9, illustrated is a training database 902 that is implemented by way of the overlay system 202. The training database 902 receives raw data from a third-party data source 904. The training database 902 stores a training dataset that is formed using the raw data. The training database 902 is implemented in form of a training database executable graph-based model 906 (hereinafter referred to as a "training database model 906"). The training dataset is used by the processing circuitry (such as, the controller module 206) to train a classification model 908 associated with the overlay system 202. Notably, the raw data requires to adhere to a set of constraints required for forming the training dataset. The processing circuitry (such as, the rule engine module 242 and the data analysis module 244) may determine whether the raw data received from the third-party data source 904 adheres to the set of constraints by way of one or more rule overlay nodes.

The raw data received from the third-party data source 904 is a person dataset and includes attributes 'Name', 'Occupation', 'Gender', and 'Marital Status'. For the sake of simplicity, data record associated with 'Person 1' is shown in FIG. 9. As shown, executable nodes 910-916 store attribute values associated with the attributes 'Name', 'Gender', 'Occupation', and 'Marital Status', respectively, of the data record associated with 'Person 1'. Further, the set of constraints to be adhered to by the raw data to form the training data may include (i) a mandatory rule for an attribute value for the attribute 'Name' being essential, (ii) a string length rule for an attribute value for the attribute 'Occupation', where the string length rule defines a range for a length of string for the attribute value for the attribute 'Occupation', and (iii) a regular expression rule that defines a list of values that is acceptable to be used as the attribute value for the attribute 'Marital Status'.

As shown, the executable node 910 has a rule overlay node 918 and a data analysis overlay node 920 associated therewith. Since, the executable node 910 stores the attribute value for the attribute 'Name', the rule overlay node 918 has a set of rules that includes the mandatory rule for the attribute value for the attribute 'Name' being essential. That is to say, the attribute value stored at the executable node 910 must not be 'null' or 'not available'. The data analysis overlay node 920 may use a set of outputs associated with the rule overlay node 918 and may determine whether a data analysis score associated with the executable node 910 exceeds the data analysis score threshold. The data analysis score being greater than the data analysis score threshold indicates that the raw data adheres to the set of rules associated with the rule overlay node 918.

The executable node 914 is associated with a rule overlay node 922 that has a set of rules that includes the string length rule for the attribute value for the attribute 'Occupation' that defines the range for the length of string for the attribute value. A data analysis overlay node 924 that is associated with the rule overlay node 922 may use a set of outputs associated with the rule overlay node 922 and may determine whether a data analysis score associated with the executable node 914 exceeds the data analysis score threshold. The data analysis score being greater than the data analysis score threshold indicates that the raw data adheres to the rules associated with the rule overlay node 922.

The executable node 916 is associated with a rule overlay node 926 that has a set of rules that includes the regular expression rule for the attribute value for the attribute 'Marital status' that defines a list of values that is acceptable to be used as the attribute value for the attribute 'Marital Status'. A data analysis overlay node 928 that is associated with the rule overlay node 926 may use a set of outputs associated with the rule overlay node 926 and may determine whether a data analysis score associated with the executable node 916 exceeds the data analysis score threshold. The data analysis score being greater than the data analysis score threshold indicates that the raw data adheres to the set of rules associated with the rule overlay node 926.

Subsequently, such analysis performed at each attribute level may result in a customized, complete, and accurate training dataset for training the classification model 908. Beneficially, use of such training dataset allows for a significant reduction in time required for training the classification model 908 and also significantly reduces a number of training cycles required for training the classification model 908.

In some embodiments, a rule overlay node may be associated with a group of nodes. As shown, a rule overlay node 930 may be associated with a group of executable nodes that form the training database model 906. For the sake of simplicity, the rule overlay node 930 is shown to be associated with the training database model 906, in implementation the rule overlay node 930 may be associated with each of the executable nodes 910-916. In such embodiments, the rule overlay node 930 may analyze the raw data based on a corresponding set of rules and generate a set of outputs. Subsequently, a data analysis overlay node 932 may use the set of outputs to generate a data analysis report for the raw data. Based on the data analysis report, the raw data may be accepted or rejected for acting as the training dataset for training the classification model 908.

In some embodiments, the classification model 908 may generate a query for a set of records in the training dataset stored in the training database 902. The processing circuitry (such as, the data analysis module 244) may analyze the set of records using the rule overlay node 930 and/or one or more rule overlay nodes associated with one or more executable nodes that store the set of records. Therefore, the processing circuitry (such as, the rule engine module 242 and the data analysis module 244) may perform a partial analysis of the training dataset based on data requirements associated with the classification model 908.

Figure 10:
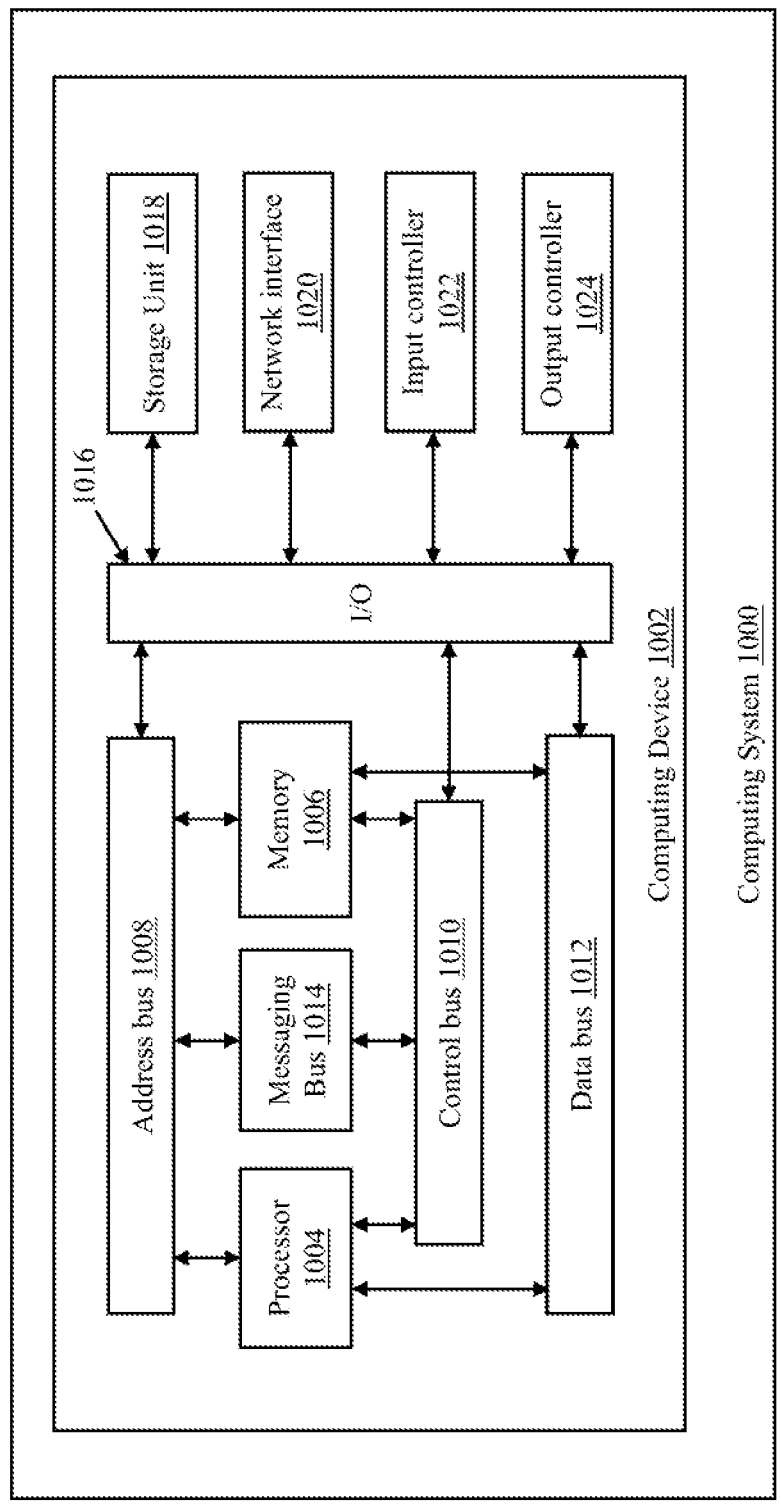
FIG. 10 shows an example computing system for carrying out the methods of the present disclosure, in accordance with an embodiment of the present disclosure.

FIG. 10 shows an example computing system 1000 for carrying out the methods of the present disclosure, in accordance with an embodiment of the present disclosure. Specifically, FIG. 10 shows a block diagram of an embodiment of the computing system 1000 according to example embodiments of the present disclosure.

The computing system 1000 may be configured to perform any of the operations disclosed herein, such as, for example, any of the operations discussed with reference to the functional modules described in relation to FIG. 2. The computing system 1000 can be implemented as a conventional computer system, an embedded controller, a laptop, a server, a mobile device, a smartphone, a set-top box, a kiosk, a vehicular information system, one or more processors associated with a television, a customized machine, any other hardware platform, or any combination or multiplicity thereof. In one embodiment, the computing system 1000 is a distributed system configured to function using multiple computing machines interconnected via a data network or bus system.

The computing system 1000 includes computing devices (such as a computing device 1002). The computing device 1002 includes one or more processors (such as a processor 1004) and a memory 1006. The processor 1004 may be any general-purpose processor(s) configured to execute a set of instructions. For example, the processor 1004 may be a processor core, a multiprocessor, a reconfigurable processor, a microcontroller, a digital signal processor (DSP), an application-specific integrated circuit (ASIC), a graphics processing unit (GPU), a neural processing unit (NPU), an accelerated processing unit (APU), a brain processing unit (BPU), a data processing unit (DPU), a holographic processing unit (HPU), an intelligent processing unit (IPU), a microprocessor/microcontroller unit (MPU/MCU), a radio processing unit (RPU), a tensor processing unit (TPU), a vector processing unit (VPU), a wearable processing unit (WPU), a field programmable gate array (FPGA), a programmable logic device (PLD), a controller, a state machine, gated logic, discrete hardware component, any other processing unit, or any combination or multiplicity thereof. In one embodiment, the processor 1004 may be multiple processing units, a single processing core, multiple processing cores, special purpose processing cores, co-processors, or any combination thereof. The processor 1004 may be communicatively coupled to the memory 1006 via an address bus 1008, a control bus 1010, a data bus 1012, and a messaging bus 1014.

The memory 1006 may include non-volatile memories such as a read only memory (ROM), a programmable read only memory (PROM), an erasable programmable read only memory (EPROM), a flash memory, or any other device capable of storing program instructions or data with or without applied power. The memory 1006 may also include volatile memories, such as a random-access memory (RAM), a static random-access memory (SRAM), a dynamic random-access memory (DRAM), and a synchronous dynamic random-access memory (SDRAM). The memory 1006 may include single or multiple memory modules. While the memory 1006 is depicted as part of the computing device 1002, a person skilled in the art will recognize that the memory 1006 can be separate from the computing device 1002.

The memory 1006 may store information that can be accessed by the processor 1004. For instance, the memory 1006 (e.g., one or more non-transitory computer-readable storage mediums, memory devices) may include computer-readable instructions (not shown) that can be executed by the processor 1004. The computer-readable instructions may be software written in any suitable programming language or may be implemented in hardware. Additionally, or alternatively, the computer-readable instructions may be executed in logically and/or virtually separate threads on the processor 1004. For example, the memory 1006 may store instructions (not shown) that when executed by the processor 1004 cause the processor 1004 to perform operations such as any of the operations and functions for which the computing system 1000 is configured, as described herein. Additionally, or alternatively, the memory 1006 may store data (not shown) that can be obtained, received, accessed, written, manipulated, created, and/or stored. The data can include, for instance, the data and/or information described herein in relation to FIGS. 1-9. In some implementations, the computing device 1002 may obtain from and/or store data in one or more memory device(s) that are remote from the computing system 1000.

The computing device 1002 may further include an input/output (I/O) interface 1016 communicatively coupled to the address bus 1008, the control bus 1010, and the data bus 1012. The data bus 1012 and messaging bus 1014 may include a plurality of tunnels that may support parallel execution of messages by the overlay system 202. The I/O interface 1016 is configured to couple to one or more external devices (e.g., to receive and send data from/to one or more external devices). Such external devices, along with the various internal devices, may also be known as peripheral devices. The I/O interface 1016 may include both electrical and physical connections for operably coupling the various peripheral devices to the computing device 1002. The I/O interface 1016 may be configured to communicate data, addresses, and control signals between the peripheral devices and the computing device 1002. The I/O interface 1016 may be configured to implement any standard interface, such as a small computer system interface (SCSI), a serial-attached SCSI (SAS), a fiber channel, a peripheral component interconnect (PCI), a PCI express (PCIe), a serial bus, a parallel bus, an advanced technology attachment (ATA), a serial ATA (SATA), a universal serial bus (USB), Thunderbolt, FireWire, various video buses, or the like. The I/O interface 1016 is configured to implement only one interface or bus technology. Alternatively, the I/O interface 1016 is configured to implement multiple interfaces or bus technologies. The I/O interface 1016 may include one or more buffers for buffering transmissions between one or more external devices, internal devices, the computing device 1002, or the processor 1004. The I/O interface 1016 may couple the computing device 1002 to various input devices, including mice, touch screens, scanners, biometric readers, electronic digitizers, sensors, receivers, touchpads, trackballs, cameras, microphones, keyboards, any other pointing devices, or any combinations thereof. The I/O interface 1016 may couple the computing device 1002 to various output devices, including video displays, speakers, printers, projectors, tactile feedback devices, automation control, robotic components, actuators, motors, fans, solenoids, valves, pumps, transmitters, signal emitters, lights, and so forth.

The computing system 1000 may further include a storage unit 1018, a network interface 1020, an input controller 1022, and an output controller 1024. The storage unit 1018, the network interface 1020, the input controller 1022, and the output controller 1024 are communicatively coupled to the central control unit (e.g., the memory 1006, the address bus 1008, the control bus 1010, and the data bus 1012) via the I/O interface 1016. The network interface 1020 communicatively couples the computing system 1000 to one or more networks such as wide area networks (WAN), local area networks (LAN), intranets, the Internet, wireless access networks, wired networks, mobile networks, telephone networks, optical networks, or combinations thereof. The network interface 1020 may facilitate communication with packet-switched networks or circuit-switched networks which use any topology and may use any communication protocol. Communication links within the network may involve various digital or analog communication media such as fiber optic cables, free-space optics, waveguides, electrical conductors, wireless links, antennas, radio-frequency communications, and so forth.

The storage unit 1018 is a computer-readable medium, preferably a non-transitory computer-readable medium, comprising one or more programs, the one or more programs comprising instructions which when executed by the processor 1004 cause the computing system 1000 to perform the method steps of the present disclosure. Alternatively, the storage unit 1018 is a transitory computer-readable medium. The storage unit 1018 can include a hard disk, a floppy disk, a compact disc read only memory (CD-ROM), a digital versatile disc (DVD), a Blu-ray disc, a magnetic tape, a flash memory, another non-volatile memory device, a solid-state drive (SSD), any magnetic storage device, any optical storage device, any electrical storage device, any semiconductor storage device, any physical-based storage device, any other data storage device, or any combination or multiplicity thereof. In one embodiment, the storage unit 1018 stores one or more operating systems, application programs, program modules, data, or any other information. The storage unit 1018 is part of the computing device 1002. Alternatively, the storage unit 1018 is part of one or more other computing machines that are in communication with the computing device 1002, such as servers, database servers, cloud storage, network attached storage, and so forth.

The input controller 1022 may include suitable logic, circuitry, interfaces, and/or code, executable by the circuitry, that may be configured to control one or more input devices that may be configured to receive an input (the stimulus 230) for the overlay system 202. The output controller 1024 may include suitable logic, circuitry, interfaces, and/or code, executable by the circuitry, that may be configured to control one or more output devices that may be configured to render/output the outcome of the operation executed to process the received input (the stimulus 230).

Figure 11A:
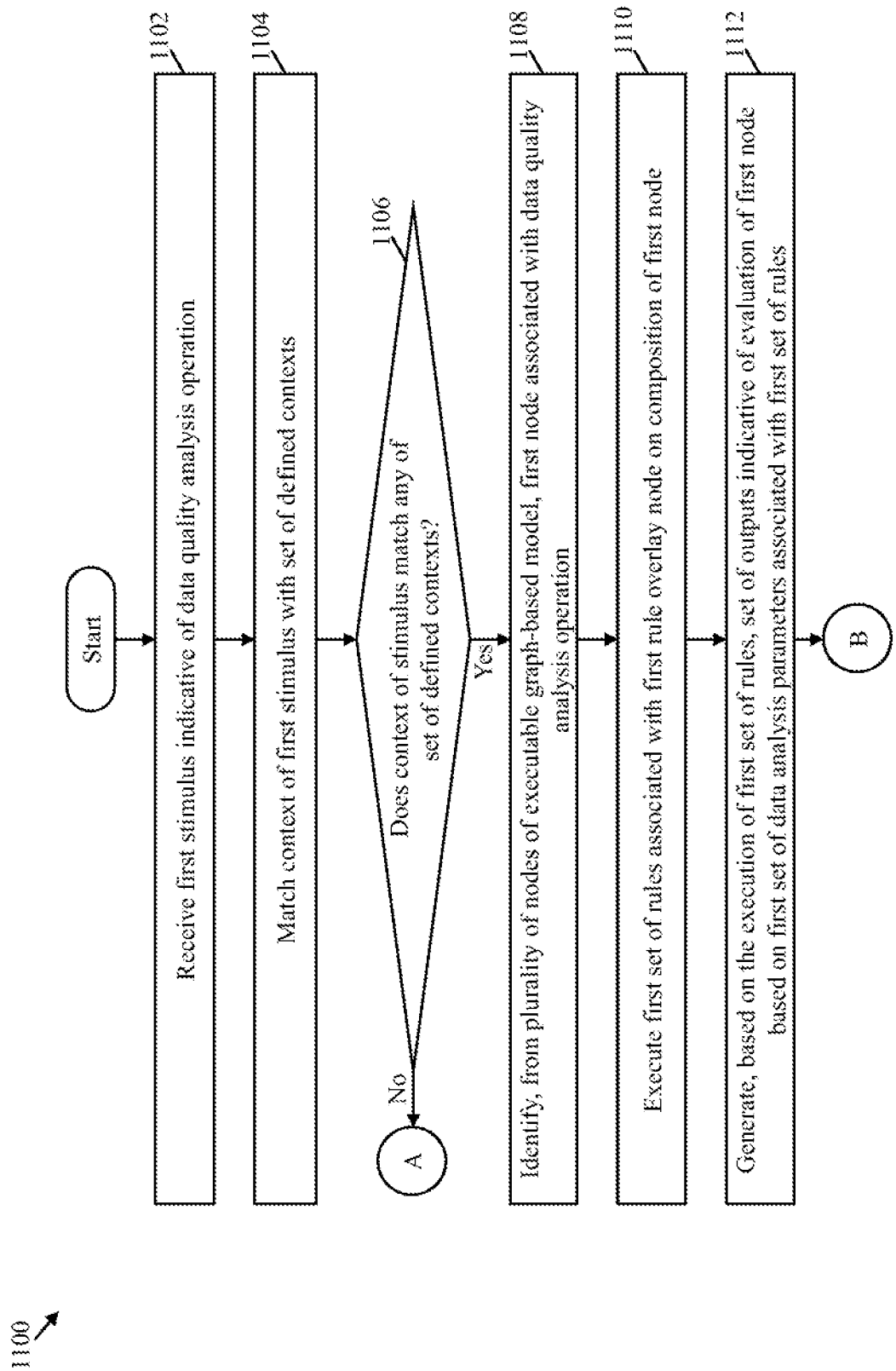
FIGS. 11A and 11B, collectively, illustrate a flowchart of a method for facilitating in-situ data analysis in the executable graph-based model, in accordance with an embodiment of the present disclosure.
Figure 11B:
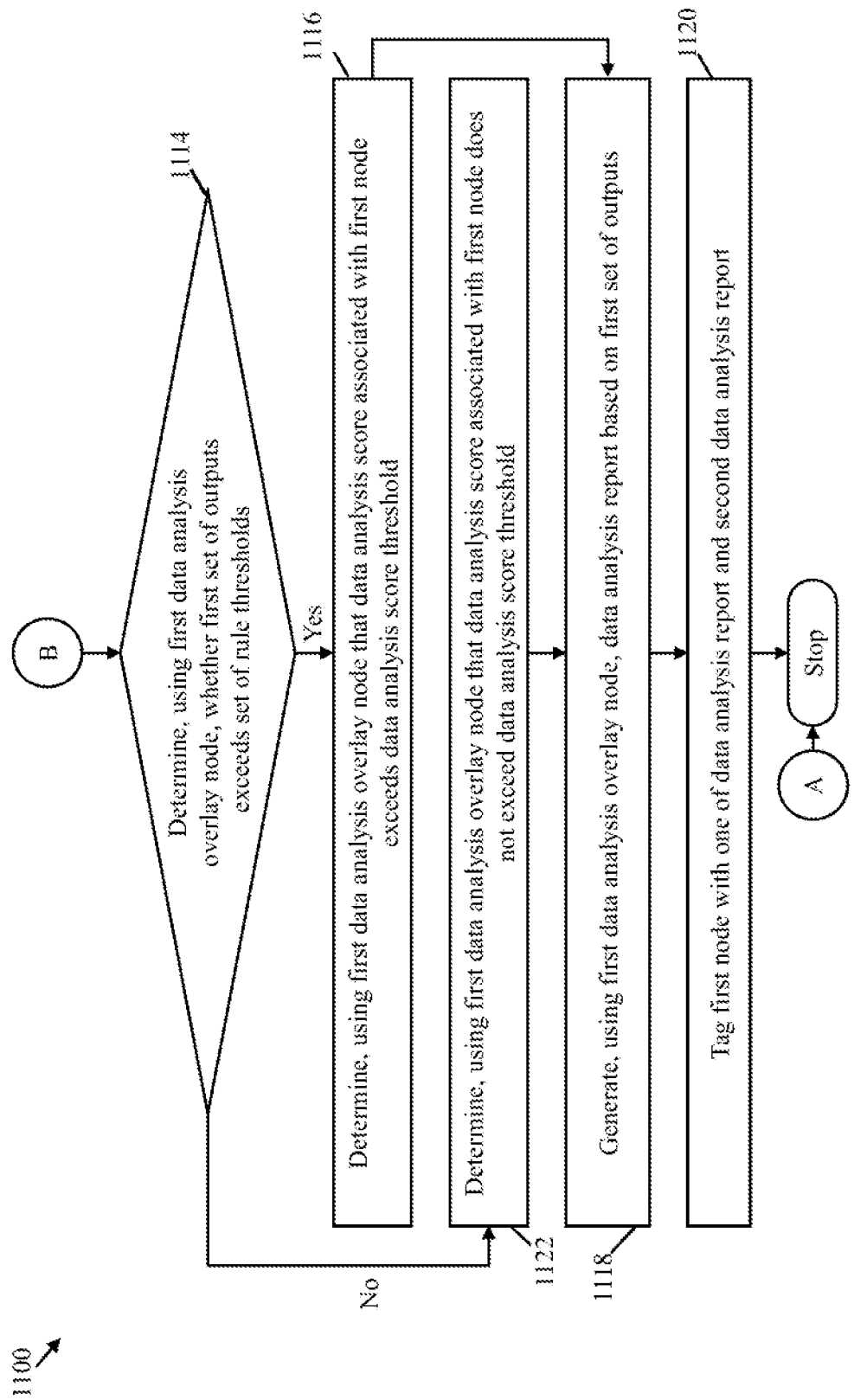

FIGS. 11A and 11B, collectively, illustrate a flowchart 1100 of a method for facilitating in-situ data analysis in the executable graph-based model 100, in accordance with an embodiment of the present disclosure. Referring to FIG. 11A, at 1102, the first stimulus is received. The first stimulus is indicative of a data analysis operation. The processing circuitry (such as, the controller module 206, the stimuli management module 212, or the like) receives the first stimulus for executing the data analysis operation.

At 1104, a context of the first stimulus is matched with the set of defined contexts. The processing circuitry (such as, the stimuli management module 212) matches the context of the first stimulus with the set of defined contexts.

At 1106, it is determined whether the context of the first stimulus matches any defined context of the set of defined contexts. The processing circuitry (such as, the context module 210) may determine, using the context container 210a, whether the context of the first stimulus matches any defined context of the set of defined contexts. When the context of the first stimulus does not match any defined context, the method terminates. When the context of the first stimulus matches one of the set of defined contexts, 1108 is executed.

At 1108, a first node associated with the data analysis operation is identified based on the context of the first stimulus. The processing circuitry (such as, the context module 210) identifies the first node from the plurality of nodes based on the context of the first stimulus. The first node is associated with a first rule overlay node and a first data analysis overlay node.

At 1110, a first set of rules associated with the first rule overlay node is executed on a composition of the first node. The processing circuitry (such as, the rule engine module 242) executes the first set of rules associated with the first rule overlay node on the composition of the first node.

At 1112, a set of outputs is generated based on the execution of the first set of rules. The set of outputs is indicative of evaluation of the first node based on a first set of data analysis parameters associated with the first set of rules. The processing circuitry (such as, the rule engine module 242) generates the set of outputs based on the execution of the first set of rules on the composition of the first node.

Referring now to FIG. 11B, at 1114, it is determined whether the set of outputs exceeds the set of rule thresholds. The processing circuitry (such as, the rule engine module 242) determines, using the set of outputs generated by the first rule overlay node, whether the set of outputs exceeds a set of rule thresholds. In an instance, when the set of outputs exceeds the set of rule thresholds, 1116 is executed.

At 1116, it is determined that a data analysis score associated with the first node exceeds the data analysis score threshold. The processing circuitry (such as, the data analysis module 244), using the first data analysis overlay node, determines that the data analysis score associated with the first node exceeds the data analysis score threshold. The first set of outputs exceeding the set of rule thresholds indicates that the data analysis score associated with the first node exceeds the data analysis score threshold.

At 1118, a data analysis report is generated based on the first set of outputs. The processing circuitry (such as, the data analysis module 244) generates, using the first data analysis overlay node, the data analysis report based on the first set of outputs. The data analysis report is indicative of data stored at the first node being usable for the one or more system operations associated with the overlay system 202.

At 1122, the first node is tagged with the data analysis report. The processing circuitry (such as, the controller module 206, the message management module 214, or the like) tags the first node with the data analysis report.

At 1114, when it is determined that the first set of outputs does not exceed the set of rule thresholds, 1122 is executed. At 1122, it is determined that the data analysis score associated with the first node does not exceed the data analysis score threshold. The processing circuitry (such as, the data analysis module 244), using the first data analysis overlay node, determines that the data analysis score associated with the first node does not exceed the data analysis score threshold. The first set of outputs not exceeding the set of rule thresholds indicates that the data analysis score associated with the first node does not exceed the data analysis score threshold.

Subsequently, 1118 is executed, where the data analysis report is indicative of the data stored at the first node being unusable for the one or more system operations associated with the overlay system 202.

The disclosed embodiments encompass numerous advantages including an efficient and seamless approach for facilitation of in-situ data analysis in the executable graph-based model 100. Therefore, the systems and methods disclosed herein do not require to share data that is to be analyzed with a third-party. Hence, the system and methods disclosed herein is independent of network availability. Also, since the data is not required to be shared externally, hence, security and confidentiality of data remains intact. Further, the systems and methods disclosed herein allow each data element to be analyzed in based on a relevant set of rules. Further, the disclosed methods and systems allow the data to be stored within the logical structure of a corresponding executable node, at an attribute value object, or at an attribute vertex node based on an approach in which the rule is to be applied on the data. Further, such storage of the data is dynamic and may be changed based on a user input. Further, the systems and methods allow the data to be analyzed in real-time. Hence, the analyzed data becomes available for use as soon as it gets analyzed. Moreover, the disclosed methods and systems allow the data to be analyzed for various purposes such as data profiling, data assessment, data quality analysis, data auditing, data quality report, or the like. Application areas of the systems and methods disclosed herein may include, but are not limited to, industrial processes, inventory management, robotics, home security, automation industry, or the like.

Certain embodiments of the disclosure may be found in the disclosed systems, methods, and non-transitory computer-readable medium, for facilitating in-situ data analysis in the executable graph-based models. The methods and systems disclosed herein include various operations performed by the processing circuitry (e.g., the controller module 206, the transaction module, 208, the message management module 214, the rule engine module 242, the data analysis module 244, any other element of the overlay system 202, or a combination of two or more elements of the overlay system 202). The systems disclosed herein includes a storage element that is configured to store an executable graph-based model. The executable graph-based model includes a plurality of nodes, a plurality of rule overlay nodes, and a plurality of data analysis overlay nodes. Each node, of the plurality of nodes, has a composition that includes a plurality of attribute values for a plurality of attributes associated with the corresponding node. Each node, of the plurality of nodes, is associated with a rule overlay node and a data analysis overlay node. The rule overlay node includes a set of rules that when executed on the composition of the corresponding node results in generation of a set of outputs indicative of evaluation of the corresponding node based on a set of data analysis parameters associated with the set of rules. The data analysis overlay node is configured to determine, based on the set of outputs, whether a data analysis score associated with the corresponding node is above a data analysis score threshold. The system further includes processing circuitry that is coupled to the storage element. The processing circuitry is configured to receive a first stimulus associated with the overlay system. The first stimulus is indicative of a first data analysis operation. The processing circuitry is further configured to identify, from the plurality of nodes, a first node associated with the first data analysis operation. The processing circuitry is further configured to execute the first data analysis operation using a first rule overlay node and a first data analysis overlay node associated with the first node. The first data analysis operation indicates whether the data analysis score associated with the first node exceeds the data analysis score threshold.

In some embodiments, the data analysis score associated with the first node is indicative of data quality associated with the first node.

In some embodiments, each data analysis parameter of the set of data analysis parameters corresponds to one of a group consisting of: (i) a completeness parameter, (ii) a uniqueness parameter, (iii) a consistency parameter, (iv) an accuracy parameter, and (v) a conformity parameter.

In some embodiments, to execute the first data analysis operation, the processing circuitry is further configured to execute, using the first rule overlay node associated with the first node, a first set of rules associated with the first rule overlay node on a first composition of the first node. The processing circuitry is further configured to generate, based on the execution of the first set of rules, a first set of outputs indicative of evaluation of the first node based on a first set of data analysis parameters associated with the first set of rules. The processing circuitry is further configured to determine, using the first rule overlay node, whether the first set of outputs exceeds a set of rule thresholds. The first set of outputs exceeding the set of rule thresholds indicates that the data analysis score associated with the first node exceeds the data analysis score threshold. The processing circuitry is further configured to generate, using the first data analysis overlay node, a first data analysis report based on the first set of outputs. The processing circuitry is further configured to tag the first node with the first data analysis report.

In some embodiments, the first data analysis overlay node is one of a group consisting of: (i) a stateful data analysis overlay node and (ii) a stateless data analysis overlay node. Based on the first data analysis overlay node being the stateful data analysis overlay node, the first data analysis report is persistent and is accessible to the processing circuitry for a predefined time-interval. Based on the first data analysis overlay node being the stateless data analysis overlay node, the first data analysis report is non-persistent and is re-generated based on a requirement thereof.

In some embodiments, the processing circuitry is configured to receive a second stimulus associated with the overlay system. The second stimulus is indicative of a second data analysis operation. The processing circuitry is further configured to identify, from the plurality of nodes, the first node associated with the second data analysis operation. The processing circuitry is further configured to execute, using the first rule overlay node and the first data analysis overlay node, the second data analysis operation. The execution of the second data analysis operation includes execution of the first set of rules associated with the first rule overlay node on the first composition of the first node using the first rule overlay node associated with the first node. The execution of the second data analysis operation further includes generation of a second set of outputs for the first set of rules based on the execution of the first set of rules. The execution of the second data analysis operation includes determination of whether the second set of outputs exceeds the set of rule thresholds, using the first data analysis overlay node. The second set of outputs exceeding the set of rule thresholds indicates that the data analysis score associated with the first node exceeds the data analysis score threshold. The processing circuitry is further configured to generate, using the first data analysis overlay node, a second data analysis report based on the second set of outputs. The processing circuitry is further configured to tag the first node with the second data analysis report and compare the first data analysis report with the second data analysis report. The processing circuitry is further configured to determine, based on the comparison, a pattern in the data analysis score associated with the first node. The pattern is indicative of one of an improvement and a degradation, in data quality associated with the first node.

In some embodiments, the first set of rules is associated with a first rule context indicative of a definition of the first set of rules. The processing circuitry is further configured to associate the first data analysis report with the first rule context. The association of the first data analysis report with the first rule context is indicative of an intent for evaluation of the first node based on the first set of data analysis parameters associated with the first set of rules.

In some embodiments, a first composition of the first node is stored within one of a group consisting of (i) a logical structure of the first node, (ii) a plurality of attribute value objects associated with the first node, and (iii) a plurality of attribute vertex nodes associated with the first node. The first node is coupled to each of the plurality of attribute vertex nodes via a corresponding attribute edge node.

In some embodiments, a first composition of the first node is stored within a logical structure of the first node based on execution of a first set of rules associated with the first rule overlay node on each attribute of a first plurality of attributes associated with the first node.

In some embodiments, based on a first plurality of attribute values of the plurality of attributes of the first node being common with at least one remaining node of the plurality of nodes, a first composition of the first node is stored within a plurality of attribute value objects associated with the first node and the remaining node. The processing circuitry is further configured to execute a second set of rules corresponding to a second rule overlay node, associated with at least one of the first node and the remaining node, on the first plurality of attribute values for evaluation thereof based on a second set of data analysis parameters associated with the second rule overlay node.

In some embodiments, based on a first plurality of attribute values of the plurality of attributes of the first node being common with at least one remaining node of the plurality of nodes, a first composition of the first node is stored within a plurality of attribute vertex nodes. Each attribute vertex node is configured to be extended by a corresponding second rule overlay node. The processing circuitry is further configured to execute a second set of rules, corresponding to the second rule overlay node of each attribute vertex node, on a corresponding attribute value of the first plurality of attribute values for evaluation thereof based on a second set of data analysis parameters associated with the second rule overlay node.

In some embodiments, the processing circuitry is further configured to (i) profile the first node based on one of a data type and data quality associated with the first node, (ii) assess the first node based on the data analysis score associated with the first node, and (iii) generate a first data analysis report based on a first set of outputs of the first rule overlay node.

In some embodiments, the overlay system further includes a context container that has a set of defined contexts. The set of defined contexts includes at least one of a group consisting of (i) a rule creation context, (ii) a rule modification context, (iii) a rule deletion context, and (iv) a rule execution context. The processing circuitry is further configured to process the first stimulus based on a context of the first stimulus being a match to the rule execution context in the set of defined contexts.

In some embodiments, the first rule overlay node includes a first set of rules. The processing circuitry is further configured to execute the first set of rules on a first composition of the first node and generate a first set of outputs for the first set of rules. Each of the first set of outputs corresponds to one of a group consisting of (i) success, (ii) fail, and (iii) partial success.

In some embodiments, the first rule overlay node includes a first set of rules. An execution of the first set of rules on a first composition of the first node results in generation of a first set of outputs. The first set of rules includes (i) a first subset of rules that have a corresponding weight higher than a threshold weight and (ii) a second subset of rules that have a corresponding weight lower than the threshold weight. Each rule of the first subset of rules corresponds to an essential rule, and each rule of the second subset of rules corresponds to an optional rule. The processing circuitry is further configured to determine whether the data analysis score associated with the first node exceeds the data score threshold based on a first subset of outputs, of a first set of outputs, that is associated with execution of the first subset of rules.

In some embodiments, the first rule overlay node is one of a group consisting of: (i) a stateful rule overlay node and (ii) a stateless rule overlay node. Based on the first rule overlay node being the stateful rule overlay node, a first set of outputs associated with the first rule overlay node is persistent and is accessible to the processing circuitry for performing the first data analysis operation on the first node for a predefined time-interval. Based on the first rule overlay node being the stateless rule overlay node, the first set of outputs is non-persistent and the first set of rules is re-executed based on a requirement of the first set of outputs.

In some embodiments, the first rule overlay node includes a first set of rules. The first set of rules includes a first set of rule statements and a first set of rule configurations. The first set of rule statements defines a first set of data analysis parameters associated with the first set of rules. The first set of rule configurations defines a first set of constraints to be adhered to during the first data analysis operation.

In some embodiments, each rule statement, of the first set of rule statements, is one of a group consisting of a mandatory rule statement, a string length rule statement, and a regular expression rule statement. Each rule configuration, of the first set of rule configurations, is one of a group consisting of a mandatory rule configuration, a string length rule configuration, and a regular expression rule configuration. Based on the first rule statement being the string length rule statement, the first rule configuration is the string length rule configuration. Based on the first rule statement being the regular expression rule statement, the first rule configuration is the regular expression rule configuration.

In some embodiments, the processing circuitry is further configured to load, in the executable graph-based model, at least one of a group consisting of the first node, the first rule overlay node, and the first data analysis overlay node, with corresponding data and processing logic.

In some embodiments, the first rule overlay node inherits from a second rule overlay node of the plurality of rule overlay nodes. The processing circuitry is further configured to load the second rule overlay node with corresponding data and processing logic based on a loading of the first rule overlay node for stimulus processing of the first stimulus.

In some embodiments, an execution of a first set of rules of the first rule overlay node requires an output of a second rule overlay node of the plurality of rule overlay nodes. The processing circuitry is further configured to load the second rule overlay node with corresponding data and processing logic based on a loading of the first rule overlay node for stimulus processing of the first stimulus.

In some embodiments, the first node is a run-time node that includes a first node template that corresponds to a predefined structure and a first node instance that corresponds to an implementation of the first node template. The first node template has one or more additional node instances. The first node template is associated with the first rule overlay node that includes a first set of rules. The processing circuitry is configured to execute the first set of rules on the first node instance and the one or more additional node instances.

In some embodiments, the first rule overlay node is associated with the first data analysis overlay node in one of a group consisting of (i) a loosely coupled manner and (ii) a tightly coupled manner. Based on the first rule overlay node being associated with the first data analysis overlay node in the tightly coupled manner, the first rule overlay node is directly associated with the first data analysis overlay node. Based on the first rule overlay node being associated with the first data analysis overlay node in the loosely coupled manner, the first rule overlay node is associated with the first data analysis overlay node via one or more intermediate nodes.

In some embodiments, each node of the plurality of nodes is one of a group consisting of a vertex node, an edge node, a role node, and an overlay node.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however, some of the operations may be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the present disclosure provide, among other features, systems and methods for facilitating in-situ data analysis in the executable graph-based model. While various embodiments of the disclosed systems and methods have been described above, it should be understood that they have been presented for purposes of example only, and not limitations. It is not exhaustive and does not limit the present disclosure to the precise form disclosed. Modifications and variations are possible in light of the above teachings or may be acquired from practicing the present disclosure, without departing from the breadth or scope.

Moreover, for example, the present technology/system may achieve the following configurations:

1. An overlay system, comprising:
    a storage element configured to store an executable graph-based model that comprises a plurality of nodes, a plurality of rule overlay nodes, and a plurality of data analysis overlay nodes,
        wherein each node, of the plurality of nodes, has a composition that includes a plurality of attribute values for a plurality of attributes associated with the corresponding node, and
        wherein each node, of the plurality of nodes, is associated with (i) a rule overlay node that includes a set of rules, where execution of the set of rules on the composition of the corresponding node results in generation of a set of outputs indicative of evaluation of the corresponding node based on a set of data analysis parameters associated with the set of rules, and (ii) a data analysis overlay node that is configured to determine, based on the set of outputs, whether a data analysis score associated with the corresponding node is above a data analysis score threshold; and
    processing circuitry that is coupled to the storage element, and configured to:
        receive a first stimulus associated with the overlay system, wherein the first stimulus is indicative of a first data analysis operation;
        identify, from the plurality of nodes, a first node associated with the first data analysis operation; and
        execute the first data analysis operation using a first rule overlay node and a first data analysis overlay node associated with the first node, wherein the first data analysis operation indicates whether the data analysis score associated with the first node exceeds the data analysis score threshold.

2. The overlay system of 1, wherein the data analysis score associated with the first node is indicative of data quality associated with the first node.

3. The overlay system of 1, wherein each data analysis parameter of the set of data analysis parameters corresponds to one of a group consisting of: (i) a completeness parameter, (ii) a uniqueness parameter, (iii) a consistency parameter, (iv) an accuracy parameter, and (v) a conformity parameter.

4. The overlay system of 1, wherein to execute the first data analysis operation, the processing circuitry is further configured to:
    execute, using the first rule overlay node associated with the first node, a first set of rules associated with the first rule overlay node on a first composition of the first node;
    generate, based on the execution of the first set of rules, a first set of outputs indicative of evaluation of the first node based on a first set of data analysis parameters associated with the first set of rules;
    determine, using the first rule overlay node, whether the first set of outputs exceeds a set of rule thresholds, wherein the first set of outputs exceeding the set of rule thresholds indicates that the data analysis score associated with the first node exceeds the data analysis score threshold;
    generate, using the first data analysis overlay node, a first data analysis report based on the first set of outputs; and
    tag the first node with the first data analysis report.

5. The overlay system of 4,
wherein the first data analysis overlay node is one of a group consisting of: (i) a stateful data analysis overlay node and (ii) a stateless data analysis overlay node,
wherein based on the first data analysis overlay node being the stateful data analysis overlay node, the first data analysis report is persistent and is accessible to the processing circuitry for a predefined time-interval, and
wherein based on the first data analysis overlay node being the stateless data analysis overlay node, the first data analysis report is non-persistent and is re-generated based on a requirement thereof.

6. The overlay system of 4, wherein the processing circuitry is further configured to:
receive a second stimulus associated with the overlay system, wherein the second stimulus is indicative of a second data analysis operation;
identify, from the plurality of nodes, the first node associated with the second data analysis operation;
execute, using the first rule overlay node and the first data analysis overlay node, the second data analysis operation, wherein the execution of the second data analysis operation comprises:
  execution of the first set of rules associated with the first rule overlay node on the first composition of the first node using the first rule overlay node associated with the first node,
  generation of a second set of outputs for the first set of rules based on the execution of the first set of rules, and
  determination of whether the second set of outputs exceeds the set of rule thresholds, using the first data analysis overlay node, where the second set of outputs exceeding the set of rule thresholds indicates that the data analysis score associated with the first node exceeds the data analysis score threshold;
generate, using the first data analysis overlay node, a second data analysis report based on the second set of outputs;
  tag the first node with the second data analysis report;
  compare the first data analysis report with the second data analysis report; and
  determine, based on the comparison, a pattern in the data analysis score associated with the first node, wherein the pattern is indicative of one of an improvement and a degradation, in data quality associated with the first node.

7. The overlay system of 4,
wherein the first set of rules is associated with a first rule context indicative of a definition of the first set of rules, and
wherein the processing circuitry is further configured to associate the first data analysis report with the first rule context, where the association of the first data analysis report with the first rule context is indicative of an intent for evaluation of the first node based on the first set of data analysis parameters associated with the first set of rules.

8. The overlay system of 1, wherein a first composition of the first node is stored within one of a group consisting of (i) a logical structure of the first node, (ii) a plurality of attribute value objects associated with the first node, and (iii) a plurality of attribute vertex nodes associated with the first node, where the first node is coupled to each of the plurality of attribute vertex nodes via a corresponding attribute edge node.

9. The overlay system of 1, wherein, a first composition of the first node is stored within a logical structure of the first node based on execution of a first set of rules associated with the first rule overlay node on each attribute of a first plurality of attributes associated with the first node.

10. The overlay system of 1,
wherein based on a first plurality of attribute values of the plurality of attributes of the first node being common with at least one remaining node of the plurality of nodes, a first composition of the first node is stored within a plurality of attribute value objects associated with the first node and the remaining node, and
wherein the processing circuitry is further configured to execute a second set of rules corresponding to a second rule overlay node, associated with the remaining node, on the first plurality of attribute values for evaluation thereof based on a second set of data analysis parameters associated with the second rule overlay node.

11. The overlay system of 1,
wherein based on a first plurality of attribute values of the plurality of attributes of the first node being common with at least one remaining node of the plurality of nodes, a first composition of the first node is stored within a plurality of attribute vertex nodes, where each attribute vertex node is configured to be extended by a corresponding second rule overlay node, and
wherein the processing circuitry is further configured to execute a second set of rules, corresponding to the second rule overlay node of each attribute vertex node, on a corresponding attribute value of the first plurality of attribute values for evaluation thereof based on a second set of data analysis parameters associated with the second rule overlay node.

12. The overlay system of 1, wherein the processing circuitry is further configured to (i) profile the first node based on one of a data type and data quality associated with the first node, (ii) assess the first node based on the data analysis score associated with the first node, and (iii) generate a first data analysis report based on a first set of outputs of the first rule overlay node.

13. The overlay system of 1, further comprising a context container that includes a set of defined contexts, wherein the set of defined contexts includes at least one of a group consisting of (i) a rule creation context, (ii) a rule modification context, (iii) a rule deletion context, and (iv) a rule execution context, and wherein the processing circuitry is further configured to process the first stimulus based on a context of the first stimulus being a match to the rule execution context in the set of defined contexts.

14. The overlay system of 1,
wherein the first rule overlay node includes a first set of rules, and
wherein the processing circuitry is further configured to:
  execute the first set of rules on a first composition of the first node; and
  generate a first set of outputs for the first set of rules, where each of the first set of outputs corresponds to one of a group consisting of (i) success, (ii) fail, and (iii) partial success.

15. The overlay system of 1,
wherein the first rule overlay node includes a first set of rules, where execution of the first set of rules on a first composition of the first node results in generation of a first set of outputs,
wherein the first set of rules includes (i) a first subset of rules that have a corresponding weight higher than a threshold weight and (ii) a second subset of rules that have a corresponding weight lower than the threshold weight, wherein each rule of the first subset of rules corresponds to an essential rule, and each rule of the second subset of rules corresponds to an optional rule, and wherein the processing circuitry is further configured to determine whether the data analysis score associated with the first node exceeds the data score threshold based on a first subset of outputs, of a first set of outputs, that is associated with execution of the first subset of rules.

16. The overlay system of 1, wherein the first rule overlay node is one of a group consisting of: (i) a stateful rule overlay node and (ii) a stateless rule overlay node, wherein based on the first rule overlay node being the stateful rule overlay node, a first set of outputs associated with the first rule overlay node is persistent and is accessible to the processing circuitry for performing a data analysis operation on the first node for a predefined time-interval, and wherein based on the first rule overlay node being the stateless rule overlay node, the first set of outputs is non-persistent and the first set of rules is re-executed based on a requirement of the first set of outputs.

17. The overlay system of 1, wherein the first data analysis overlay node is one of a group consisting of: (i) a stateful data analysis overlay node and (ii) a stateless data analysis overlay node, wherein based on the first data analysis overlay node being the stateful data analysis overlay node, a first data analysis report of the first data analysis overlay node is persistent and is accessible to the processing circuitry for a predefined time-interval, and wherein based on the first data analysis overlay node being the stateless data analysis overlay node, the first data analysis report is non-persistent and is re-generated based on a requirement thereof.

18. The overlay system of 1, wherein the first rule overlay node includes a first set of rules, and wherein the first set of rules includes a first set of rule statements and a first set of rule configurations, where the first set of rule statements defines a first set of data analysis parameters associated with the first set of rules, whereas the first set of rule configurations defines a first set of constraints to be adhered to during the first data analysis operation.

19. The overlay system of 18, wherein each rule statement, of the first set of rule statements, is one of a group consisting of a mandatory rule statement, a string length rule statement, and a regular expression rule statement, wherein each rule configuration, of the first set of rule configurations, is one of a group consisting of a string length rule configuration, and a regular expression rule configuration, wherein based on the first rule statement being the string length rule statement, the first rule configuration is the string length rule configuration, and wherein based on the first rule statement being the regular expression rule statement, the first rule configuration is the regular expression rule configuration.

20. The overlay system of 1, wherein the processing circuitry is further configured to:

load, in the executable graph-based model, at least one of a group consisting of the first node, the first rule overlay node, and the first data analysis overlay node, with corresponding data and processing logic.

21. The overlay system of 1, wherein the first rule overlay node inherits from a second rule overlay node of the plurality of rule overlay nodes, and wherein the processing circuitry is further configured to load the second rule overlay node with corresponding data and processing logic based on a loading of the first rule overlay node for stimulus processing of the first stimulus.

22. The overlay system of 1, wherein an execution of a first set of rules of the first rule overlay node requires an output of a second rule overlay node of the plurality of rule overlay nodes, and wherein the processing circuitry is further configured to load the second rule overlay node with corresponding data and processing logic based on a loading of the first rule overlay node for stimulus processing of the first stimulus.

23. The overlay system of 1, wherein the first node is a run-time node that includes a first node template that corresponds to a predefined structure and a first node instance that corresponds to an implementation of the first node template, where the first node template has one or more additional node instances, and wherein the first node template is associated with the first rule overlay node that includes a first set of rules, and wherein the processing circuitry is configured to execute the first set of rules on the first node instance and the one or more additional node instances.

24. The overlay system of 1, wherein the first rule overlay node is associated with the first data analysis overlay node in one of a group consisting of (i) a loosely coupled manner and (ii) a tightly coupled manner, and wherein based on the first rule overlay node being associated with the first data analysis overlay node in the tightly coupled manner, the first rule overlay node is directly associated with the first data analysis overlay node, whereas based on the first rule overlay node being associated with the first data analysis overlay node in the loosely coupled manner, the first rule overlay node is associated with the first data analysis overlay node via one or more intermediate nodes.

25. The overlay system of 1, wherein each node of the plurality of nodes is one of a group consisting of a vertex node, an edge node, a role node, and an overlay node.

26. A method, comprising:

receiving, by processing circuitry of an overlay system, a stimulus associated with the overlay system, where the stimulus is indicative of a data analysis operation, wherein an executable graph-based model is stored in a storage element of the overlay system, wherein the executable graph-based model comprises a plurality of nodes, a plurality of rule overlay nodes, and a plurality of data analysis overlay nodes, wherein each node, of the plurality of nodes, has a composition that includes a plurality of attribute values for a plurality of attributes associated with the corresponding node, and wherein each node, of the plurality of nodes, is associated with a rule overlay node and a data analysis overlay node;
identifying, by the processing circuitry, from the plurality of nodes, a first node associated with the data analysis operation, wherein the first node is associated with a first rule overlay node, of the plurality of rule overlay nodes, and a first data analysis overlay node, of the plurality of data analysis overlay nodes;
executing, by the processing circuitry, a first set of rules associated with the first rule overlay node on a composition of the first node;
generating, by the processing circuitry, based on the execution of the first set of rules, a set of outputs indicative of evaluation of the first node based on a first set of data analysis parameters associated with the first set of rules; and determining, by the processing circuitry, using the first rule overlay node, whether the set of outputs exceeds a set of rule thresholds; and determining, by the processing circuitry, using the first data analysis overlay node whether a data analysis score associated with the first node exceeds a data analysis score threshold, wherein the first set of outputs exceeding the set of rule thresholds indicates that the data analysis score associated with the first node exceeds the data analysis score threshold.

What is claimed is:

1. An overlay system, comprising:
a storage element configured to store an executable graph-based model that comprises a plurality of nodes, a plurality of rule overlay nodes, and a plurality of data analysis overlay nodes,
wherein each node, of the plurality of nodes, has a composition that includes a plurality of attribute values for a plurality of attributes associated with the corresponding node, and
wherein each node, of the plurality of nodes, is associated with (i) a rule overlay node that includes a set of rules, where execution of the set of rules on the composition of the corresponding node results in generation of a set of outputs indicative of evaluation of the corresponding node based on a set of data analysis parameters associated with the set of rules, and (ii) a data analysis overlay node that is configured to determine, based on the set of outputs, whether a data analysis score associated with the corresponding node is above a data analysis score threshold; and
processing circuitry that is coupled to the storage element, and configured to:
receive a first stimulus associated with the overlay system, wherein the first stimulus is indicative of a first data analysis operation;
identify, from the plurality of nodes, a first node associated with the first data analysis operation; and
execute the first data analysis operation using a first rule overlay node and a first data analysis overlay node associated with the first node, wherein the first data analysis operation indicates whether the data analysis score associated with the first node exceeds the data analysis score threshold.

2. The overlay system of claim 1, wherein the data analysis score associated with the first node is indicative of data quality associated with the first node.

3. The overlay system of claim 1, wherein each data analysis parameter, of the set of data analysis parameters, corresponds to one of a group consisting of (i) a completeness parameter, (ii) a uniqueness parameter, (iii) a consistency parameter, (iv) an accuracy parameter, and (v) a conformity parameter.

4. The overlay system of claim 1, wherein to execute the first data analysis operation, the processing circuitry is further configured to:
execute, using the first rule overlay node associated with the first node, a first set of rules associated with the first rule overlay node on a first composition of the first node;
generate, based on the execution of the first set of rules, a first set of outputs indicative of evaluation of the first node based on a first set of data analysis parameters associated with the first set of rules;
determine, using the first rule overlay node, whether the first set of outputs exceeds a set of rule thresholds, wherein the first set of outputs exceeding the set of rule thresholds indicates that the data analysis score associated with the first node exceeds the data analysis score threshold;
generate, using the first data analysis overlay node, a first data analysis report based on the first set of outputs; and
tag the first node with the first data analysis report.

5. The overlay system of claim 4, wherein the processing circuitry is further configured to:
receive a second stimulus associated with the overlay system, wherein the second stimulus is indicative of a second data analysis operation;
identify, from the plurality of nodes, the first node associated with the second data analysis operation;
execute, using the first rule overlay node and the first data analysis overlay node, the second data analysis operation, wherein the execution of the second data analysis operation comprises:
execution of the first set of rules associated with the first rule overlay node on the first composition of the first node using the first rule overlay node associated with the first node,
generation of a second set of outputs for the first set of rules based on the execution of the first set of rules, and
determination of whether the second set of outputs exceeds the set of rule thresholds, using the first data analysis overlay node, where the second set of outputs exceeding the set of rule thresholds indicates that the data analysis score associated with the first node exceeds the data analysis score threshold;
generate, using the first data analysis overlay node, a second data analysis report based on the second set of outputs;
tag the first node with the second data analysis report;
compare the first data analysis report with the second data analysis report; and
determine, based on the comparison, a pattern in the data analysis score associated with the first node, wherein the pattern is indicative of one of an improvement and a degradation, in data quality associated with the first node.

6. The overlay system of claim 4,
wherein the first set of rules is associated with a first rule context indicative of a definition of the first set of rules, and
wherein the processing circuitry is further configured to associate the first data analysis report with the first rule context, where the association of the first data analysis report with the first rule context is indicative of an intent for evaluation of the first node based on the first set of data analysis parameters associated with the first set of rules.

7. The overlay system of claim 1, wherein a first composition of the first node is stored within one of a group consisting of (i) a logical structure of the first node, (ii) a plurality of attribute value objects associated with the first node, and (iii) a plurality of attribute vertex nodes associated with the first node, where the first node is coupled to each of the plurality of attribute vertex nodes via a corresponding attribute edge node.

8. The overlay system of claim 1, wherein a first composition of the first node is stored within a logical structure of the first node based on execution of a first set of rules associated with the first rule overlay node on each attribute of a first plurality of attributes associated with the first node.

9. The overlay system of claim 1,
wherein based on a first plurality of attribute values of the plurality of attributes of the first node being common with at least one remaining node of the plurality of nodes, a first composition of the first node is stored within a plurality of attribute value objects associated with the first node and the remaining node, and
wherein the processing circuitry is further configured to execute a second set of rules corresponding to a second rule overlay node, associated with the remaining node, on the first plurality of attribute values for evaluation thereof based on a second set of data analysis parameters associated with the second rule overlay node.

10. The overlay system of claim 1,
wherein based on a first plurality of attribute values of the plurality of attributes of the first node being common with at least one remaining node of the plurality of nodes, a first composition of the first node is stored within a plurality of attribute vertex nodes, where each attribute vertex node is configured to be extended by a corresponding second rule overlay node, and
wherein the processing circuitry is further configured to execute a second set of rules, corresponding to a second rule overlay node of each attribute vertex node, on a corresponding attribute value of the first plurality of attribute values for evaluation thereof based on a second set of data analysis parameters associated with the second rule overlay node.

11. The overlay system of claim 1, wherein the processing circuitry is further configured to (i) profile the first node based on one of a data type and data quality associated with the first node, (ii) assess the first node based on the data analysis score associated with the first node, and (iii) generate a first data analysis report based on a first set of outputs of the first rule overlay node.

12. The overlay system of claim 1, further comprising a context container that includes a set of defined contexts, wherein the set of defined contexts includes at least one of a group consisting of (i) a rule creation context, (ii) a rule modification context, (iii) a rule deletion context, and (iv) a rule execution context, and wherein the processing circuitry is further configured to process the first stimulus based on a context of the first stimulus being a match to the rule execution context in the set of defined contexts.

13. The overlay system of claim 1,
wherein the first rule overlay node includes a first set of rules, and
wherein the processing circuitry is further configured to:
execute the first set of rules on a first composition of the first node; and generate a first set of outputs for the first set of rules, where each of the first set of outputs corresponds to one of a group consisting of (i) success, (ii) fail, and (iii) partial success.

14. The overlay system of claim 1,
wherein the first rule overlay node includes a first set of rules, where execution of the first set of rules on a first composition of the first node results in generation of a first set of outputs,
wherein the first set of rules includes (i) a first subset of rules that have a corresponding weight higher than a threshold weight and (ii) a second subset of rules that have a corresponding weight lower than the threshold weight,
wherein each rule of the first subset of rules corresponds to an essential rule, and each rule of the second subset of rules corresponds to an optional rule, and
wherein the processing circuitry is further configured to determine whether the data analysis score associated with the first node exceeds the data analysis score threshold based on a first subset of outputs, of the first set of outputs, that is associated with execution of the first subset of rules.

15. The overlay system of claim 1,
wherein the first rule overlay node is one of a group consisting of (i) a stateful rule overlay node and (ii) a stateless rule overlay node,
wherein based on the first rule overlay node being the stateful rule overlay node, a first set of outputs associated with the first rule overlay node is persistent and is accessible to the processing circuitry for performing a data analysis operation on the first node for a predefined time-interval, and
wherein based on the first rule overlay node being the stateless rule overlay node, the first set of outputs is non-persistent and a first set of rules, of the first rule overlay node, is re-executed based on a requirement of the first set of outputs.

16. The overlay system of claim 1,
wherein the first rule overlay node includes a first set of rules, and
wherein the first set of rules includes a first set of rule statements and a first set of rule configurations, where the first set of rule statements defines a first set of data analysis parameters associated with the first set of rules, whereas the first set of rule configurations defines a first set of constraints to be adhered to during the first data analysis operation.

17. The overlay system of claim 16,
wherein a first rule statement, of the first set of rule statements, is one of a group consisting of a mandatory rule statement, a string length rule statement, and a regular expression rule statement,
wherein a first rule configuration, of the first set of rule configurations, is one of a group consisting of a string length rule configuration and a regular expression rule configuration,
wherein based on the first rule statement being the string length rule statement, the first rule configuration is the string length rule configuration, and
wherein based on the first rule statement being the regular expression rule statement, the first rule configuration is the regular expression rule configuration.

18. The overlay system of claim 1, wherein the processing circuitry is further configured to load, in the executable graph-based model, at least one of a group consisting of the first node, the first rule overlay node, and the first data analysis overlay node, with corresponding data and processing logic.

19. The overlay system of claim 1,
wherein the first node is a run-time node that includes a first node template that corresponds to a predefined structure and a first node instance that corresponds to an implementation of the first node template, where the first node template has one or more additional node instances, and
wherein the first node template is associated with the first rule overlay node that includes a first set of rules, and
wherein the processing circuitry is configured to execute the first set of rules on the first node instance and the one or more additional node instances.

20. A method, comprising:
receiving, by processing circuitry of an overlay system, a stimulus associated with the overlay system, where the stimulus is indicative of a data analysis operation,
wherein an executable graph-based model is stored in a storage element of the overlay system,
wherein the executable graph-based model comprises a plurality of nodes, a plurality of rule overlay nodes, and a plurality of data analysis overlay nodes,
wherein each node, of the plurality of nodes, has a composition that includes a plurality of attribute values for a plurality of attributes associated with the corresponding node, and
wherein each node, of the plurality of nodes, is associated with a rule overlay node and a data analysis overlay node;
identifying, by the processing circuitry, from the plurality of nodes, a first node associated with the data analysis operation, wherein the first node is associated with a first rule overlay node, of the plurality of rule overlay nodes, and a first data analysis overlay node, of the plurality of data analysis overlay nodes;
executing, by the processing circuitry, a first set of rules associated with the first rule overlay node on a first composition of the first node;
generating, by the processing circuitry, based on the execution of the first set of rules, a set of outputs indicative of evaluation of the first node based on a first set of data analysis parameters associated with the first set of rules; and
determining, by the processing circuitry, using the first rule overlay node, whether the set of outputs exceeds a set of rule thresholds; and
determining, by the processing circuitry, using the first data analysis overlay node whether a data analysis score associated with the first node exceeds a data analysis score threshold, wherein the set of outputs exceeding the set of rule thresholds indicates that the data analysis score associated with the first node exceeds the data analysis score threshold.

* * * * *